(12) United States Patent  
Park

(10) Patent No.: US 8,296,529 B2
(45) Date of Patent: Oct. 23, 2012

(54) WRITE-ONCE OPTICAL DISC AND METHOD FOR RECORDING MANAGEMENT INFORMATION THEREON

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 877 days.

(21) Appl. No.: 10/934,496

(22) Filed: Sep. 7, 2004

(65) Prior Publication Data

US 2005/0052972 A1   Mar. 10, 2005

(30) Foreign Application Priority Data

Sep. 8, 2003 (KR) .......................... 10-2003-0062674
Oct. 13, 2003 (KR) .......................... 10-2003-0071127

(51) Int. Cl.
*G11B 7/013* (2006.01)
(52) U.S. Cl. ....... 711/154; 711/5; 369/272.1; 369/275.3
(58) Field of Classification Search .............. 711/5, 154; 369/272.1, 275.3
See application file for complete search history.

(56) References Cited

U.S. PATENT DOCUMENTS

| | | | |
|---|---|---|---|
| 4,558,446 A | 12/1985 | Banba et al. | |
| 4,733,386 A * | 3/1988 | Shimoi | 369/53.21 |
| 4,807,205 A | 2/1989 | Picard et al. | |
| 4,963,866 A | 10/1990 | Duncan | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |
| 5,247,494 A | 9/1993 | Ohno et al. | |
| 5,319,626 A | 6/1994 | Ozaki et al. | |
| 5,404,357 A | 4/1995 | Ito et al. | |
| 5,426,624 A | 6/1995 | Goto | |
| 5,442,611 A * | 8/1995 | Hosaka | 369/47.23 |
| 5,448,728 A * | 9/1995 | Takano et al. | 1/1 |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,555,537 A | 9/1996 | Imaino et al. | |

(Continued)

FOREIGN PATENT DOCUMENTS

CN        1134017 A        10/1996
(Continued)

OTHER PUBLICATIONS

JIS handbook data processing for hardware, Japan, Japanese Standards Association Inc., Apr. 21, 1999, pp. 1064-1070.

(Continued)

*Primary Examiner* — Yaima Campos
*Assistant Examiner* — Samuel Dillon
(74) *Attorney, Agent, or Firm* — Birch, Stewart, Kolasch & Birch, LLP

(57) ABSTRACT

A write-once optical disc and a method and apparatus for recording management information on the disc are provided. The method includes recording an opened SRR information on a recording medium, and removing an identification of a certain SRR from the opened SRR information once the certain SRR is closed. The opened SRR information carries an identification of any opened SRR, and the number of opened SRRs allowed is at most a predetermined number.

26 Claims, 32 Drawing Sheets

Step 6-1. Close session without padding

U.S. PATENT DOCUMENTS

| | | | |
|---|---|---|---|
| 5,577,194 A | 11/1996 | Wells et al. | |
| 5,608,715 A | 3/1997 | Yokogawa et al. | |
| 5,666,531 A * | 9/1997 | Martin | 707/204 |
| 5,715,221 A | 2/1998 | Ito et al. | |
| 5,720,030 A | 2/1998 | Kamihara et al. | |
| 5,732,053 A | 3/1998 | Yano et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,825,726 A | 10/1998 | Hwang et al. | |
| 5,848,038 A | 12/1998 | Igarashi et al. | |
| 5,860,088 A * | 1/1999 | Benhase et al. | 711/112 |
| 5,862,117 A * | 1/1999 | Fuentes et al. | 369/100 |
| 5,867,455 A | 2/1999 | Miyamoto et al. | |
| 5,878,020 A | 3/1999 | Takahashi | |
| 5,914,928 A | 6/1999 | Takahashi et al. | |
| 5,920,526 A * | 7/1999 | Udagawa | 369/30.15 |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,208,602 B1 | 3/2001 | Frank | |
| 6,233,654 B1 | 5/2001 | Aoki et al. | |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,370,096 B1 * | 4/2002 | Hashimoto | 369/53.2 |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,418,100 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,748,485 B1 | 6/2004 | Yokota et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,785,219 B1 | 8/2004 | Sasaki et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 * | 1/2005 | Nakahara et al. | 369/47.13 |
| 6,883,111 B2 | 4/2005 | Yoshida et al. | |
| 6,885,623 B1 | 4/2005 | Oishi et al. | |
| 6,918,003 B2 * | 7/2005 | Sasaki | 711/112 |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,031,239 B2 | 4/2006 | Takahashi et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,092,911 B2 | 8/2006 | Yokota et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,203,139 B2 | 4/2007 | Terada et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 7,400,565 B2 * | 7/2008 | Sasaki | 369/53.24 |
| 7,506,109 B2 | 3/2009 | Park | |
| 7,529,171 B2 | 5/2009 | Ito et al. | |
| 7,539,114 B2 * | 5/2009 | Kawakami et al. | 369/94 |
| 7,573,792 B2 | 8/2009 | Park | |
| 2001/0009537 A1 | 7/2001 | Park | |
| 2001/0011267 A1 | 8/2001 | Kihara et al. | |
| 2001/0020261 A1 | 9/2001 | Ando et al. | |
| 2001/0021144 A1 | 9/2001 | Oshima et al. | |
| 2001/0026511 A1 | 10/2001 | Ueda et al. | |
| 2001/0034855 A1 | 10/2001 | Ando et al. | |
| 2001/0043525 A1 | 11/2001 | Ito et al. | |
| 2002/0025138 A1 | 2/2002 | Isobe et al. | |
| 2002/0035705 A1 | 3/2002 | Ando et al. | |
| 2002/0049938 A1 | 4/2002 | Ko | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 * | 9/2002 | Ito et al. | 369/53.36 |
| 2002/0136537 A1 | 9/2002 | Takahashi | |
| 2002/0159382 A1 | 10/2002 | Ohata et al. | |
| 2002/0161774 A1 * | 10/2002 | Tol et al. | 707/100 |
| 2002/0176341 A1 | 11/2002 | Ko et al. | |
| 2002/0186341 A1 | 12/2002 | Yamamura et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0133369 A1 * | 7/2003 | Sasaki | 369/30.11 |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0137913 A1 | 7/2003 | Oshima et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0090888 A1 | 5/2004 | Park et al. | |
| 2004/0105363 A1 | 6/2004 | Ko et al. | |
| 2004/0114474 A1 | 6/2004 | Park et al. | |
| 2004/0120233 A1 * | 6/2004 | Park et al. | 369/47.13 |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0160799 A1 | 8/2004 | Park et al. | |
| 2004/0165495 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |

| | | | | | | |
|---|---|---|---|---|---|---|
| 2005/0007910 | A1 | 1/2005 | Ito et al. | JP | 06-349201 A | 12/1994 |
| 2005/0008346 | A1 | 1/2005 | Noguchi et al. | JP | 7-168749 A | 7/1995 |
| 2005/0025007 | A1 | 2/2005 | Park | JP | 7-220400 A | 8/1995 |
| 2005/0047294 | A1 | 3/2005 | Park | JP | 08-096522 A | 4/1996 |
| 2005/0050402 | A1 | 3/2005 | Koda et al. | JP | 8-147702 A | 6/1996 |
| 2005/0052972 | A1 | 3/2005 | Park | JP | 8-273162 A | 10/1996 |
| 2005/0052973 | A1 | 3/2005 | Park | JP | 8-287595 A | 11/1996 |
| 2005/0055500 | A1 | 3/2005 | Park | JP | 9-45004 A | 2/1997 |
| 2005/0060489 | A1 | 3/2005 | Park | JP | 09-145634 A | 6/1997 |
| 2005/0068877 | A1 | 3/2005 | Yeo | JP | 09-231053 A | 9/1997 |
| 2005/0083740 | A1 | 4/2005 | Kobayashi | JP | 9-270175 A | 10/1997 |
| 2005/0083767 | A1 | 4/2005 | Terada et al. | JP | 9-282849 A | 10/1997 |
| 2005/0083830 | A1 | 4/2005 | Martens et al. | JP | 9-288884 A | 11/1997 |
| 2005/0157619 | A1 | 7/2005 | Miyawaki et al. | JP | 10-049991 A | 2/1998 |
| 2005/0195716 | A1 | 9/2005 | Ko et al. | JP | 10-050005 A | 2/1998 |
| 2005/0207262 | A1 | 9/2005 | Terada et al. | JP | 10-050032 A | 2/1998 |
| 2005/0289389 | A1 | 12/2005 | Yamagami et al. | JP | 10-187356 A | 7/1998 |
| 2006/0077827 | A1 | 4/2006 | Takahashi | JP | 10-187357 | 7/1998 |
| 2006/0136134 | A1 | 6/2006 | Mihara | JP | 10-187358 | 7/1998 |
| 2006/0195719 | A1 | 8/2006 | Ueda et al. | JP | 10-187359 | 7/1998 |
| 2006/0203635 | A1 | 9/2006 | Ko et al. | JP | 10-187360 | 7/1998 |
| 2006/0203638 | A1 | 9/2006 | Ko et al. | JP | 10-187361 A1 | 7/1998 |
| 2006/0203684 | A1 | 9/2006 | Ko et al. | JP | 10-199154 A | 7/1998 |
| 2006/0227694 | A1 | 10/2006 | Woerlee et al. | JP | 11-110888 A | 4/1999 |
| 2006/0280076 | A1* | 12/2006 | Bondijk ............... 369/47.21 | JP | 11-203792 A | 7/1999 |
| 2007/0294571 | A1 | 12/2007 | Park et al. | JP | 2000-21093 A | 1/2000 |
| 2008/0046780 | A1 | 2/2008 | Shibuya et al. | JP | 2000-090588 A | 3/2000 |
| | | | | JP | 2000-149449 A | 5/2000 |
| FOREIGN PATENT DOCUMENTS | | | | JP | 2000-195178 A | 7/2000 |
| | | | | JP | 2000-215612 | 8/2000 |
| CN | 1140897 | C | 1/1997 | JP | 2000-285607 A | 10/2000 |
| CN | 1214147 | A | 4/1999 | JP | 2000-348057 A | 12/2000 |
| CN | 1227950 | A | 9/1999 | JP | 2001-023317 A | 1/2001 |
| CN | 1273419 | A | 11/2000 | JP | 2001-69440 A | 3/2001 |
| CN | 1675708 | A | 9/2005 | JP | 2001-110168 A | 4/2001 |
| CN | 1685426 | A | 10/2005 | JP | 2001-148166 A | 5/2001 |
| DE | 199 54 054 | A1 | 6/2000 | JP | 2001-319339 A | 11/2001 |
| EP | 0314186 | A2 | 5/1989 | JP | 2001-351334 A | 12/2001 |
| EP | 0325823 | A1 | 8/1989 | JP | 2001-357623 A | 12/2001 |
| EP | 0350920 | A2 | 1/1990 | JP | 2002-015507 A | 1/2002 |
| EP | 0464811 | A2 | 1/1992 | JP | 2002-015525 A | 1/2002 |
| EP | 0472484 | A2 | 2/1992 | JP | 2002-056619 A | 2/2002 |
| EP | 0477503 | A2 | 4/1992 | JP | 2002-117652 A | 4/2002 |
| EP | 0556046 | A1 | 8/1993 | JP | 2002-170342 A | 6/2002 |
| EP | 0871172 | A2 | 10/1998 | JP | 2002-215612 A | 8/2002 |
| EP | 0908882 | A2 | 4/1999 | JP | 2002-245723 A | 8/2002 |
| EP | 0 971 345 | A1 | 1/2000 | JP | 2002-117649 A | 10/2002 |
| EP | 0974967 | A1 | 1/2000 | JP | 2002-288938 A | 10/2002 |
| EP | 0989554 | A1 | 3/2000 | JP | 2002-329321 A | 11/2002 |
| EP | 0997904 | A1 | 5/2000 | JP | 2002-352522 A | 12/2002 |
| EP | 1026681 | B1 | 8/2000 | JP | 2003-30844 A | 1/2003 |
| EP | 1 040 937 | A1 | 10/2000 | JP | 2003-85882 A | 3/2003 |
| EP | 1043723 | A1 | 10/2000 | JP | 2003-208779 A | 7/2003 |
| EP | 1132914 | A2 | 9/2001 | JP | 2003-228962 A | 8/2003 |
| EP | 1148493 | A2 | 10/2001 | JP | 2003-249029 A | 9/2003 |
| EP | 1152414 | A2 | 11/2001 | JP | 2003-335062 A | 11/2003 |
| EP | 1239478 | A1 | 9/2002 | JP | 2003-536194 A | 12/2003 |
| EP | 1 321-940 | A1 | 12/2002 | JP | 2004-079087 A | 3/2004 |
| EP | 1274081 | A2 | 1/2003 | JP | 2004-95057 A | 3/2004 |
| EP | 1298659 | A1 | 4/2003 | JP | 2004-118910 A | 4/2004 |
| EP | 1329888 | A1 | 7/2003 | JP | 2004-213769 A | 7/2004 |
| EP | 1347452 | A2 | 9/2003 | JP | 2004-213774 A | 7/2004 |
| EP | 1547065 | | 6/2005 | JP | 2004-280864 A | 10/2004 |
| EP | 1564740 | A1 | 8/2005 | JP | 2004-280865 A | 10/2004 |
| EP | 1573723 | | 9/2005 | JP | 2004-280866 A | 10/2004 |
| EP | 1612790 | A1 | 1/2006 | JP | 2005-032374 A | 2/2005 |
| EP | 1 623 421 | | 2/2006 | JP | 2005-44495 A | 2/2005 |
| EP | 1623422 | | 2/2006 | JP | 2005-004912 A | 6/2005 |
| EP | 1 644 920 | | 4/2006 | JP | 2005-535993 A | 11/2005 |
| EP | 1 658 613 | | 5/2006 | JP | 2005-538490 A | 12/2005 |
| GB | 2356735 | A | 5/2001 | JP | 2005-538491 A | 12/2005 |
| JP | 63-091842 | A | 4/1988 | JP | 2006-519445 A | 8/2006 |
| JP | 64-79940 | A | 3/1989 | JP | 2007-502512 A | 2/2007 |
| JP | 01-263955 | A | 10/1989 | JP | 2007-66515 A | 3/2007 |
| JP | 02-023417 | A | 1/1990 | KR | 1020040094301 A | 11/2004 |
| JP | 2-54327 | A | 2/1990 | KR | 10-2004-0100702 A | 12/2004 |
| JP | 3-46164 | A | 2/1991 | KR | 10-2005-0109894 A | 11/2005 |
| JP | 05-274814 | A | 10/1993 | KR | 10-2006-0052789 A | 5/2006 |
| JP | 6-20449 | A | 1/1994 | KR | 10-2010-0072379 A | 6/2010 |
| JP | 6-309802 | A | 11/1994 | | | |

| | | |
|---|---|---|
| RU | 2005 103 626 | 9/2005 |
| RU | 2005 127 337 | 2/2006 |
| TW | 283232 A | 8/1996 |
| TW | 302475 A | 4/1997 |
| TW | 371752 | 10/1999 |
| TW | 413805 | 12/2000 |
| TW | 484119 | 4/2002 |
| TW | 486913 | 5/2002 |
| TW | 495750 B | 7/2002 |
| TW | 508592 | 11/2002 |
| WO | WO-84/00628 A1 | 2/1984 |
| WO | WO-96/30902 A1 | 10/1996 |
| WO | WO-97/22182 A1 | 6/1997 |
| WO | WO 00/19432 | 4/2000 |
| WO | WO 00/54158 A1 | 9/2000 |
| WO | WO-00/54274 A1 | 9/2000 |
| WO | WO-01/22416 A1 | 3/2001 |
| WO | WO-01/75879 A1 | 10/2001 |
| WO | WO-01/93035 A2 | 12/2001 |
| WO | WO 02/086887 A1 | 10/2002 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/075180 A1 | 9/2004 |
| WO | WO-2004/077415 A1 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO 2004/105024 A1 | 12/2004 |
| WO | WO-2005/004123 A1 | 1/2005 |
| WO | WO-2005/004154 A2 | 1/2005 |
| WO | WO-2005/006314 A1 | 1/2005 |

OTHER PUBLICATIONS

Parlante, "Linked List Basics", Document No. 103, Apr. 12, 2001, pp. 1-26, http://cslibrary.stanford.edu/103/LinkedListBasics.pdf.

* cited by examiner

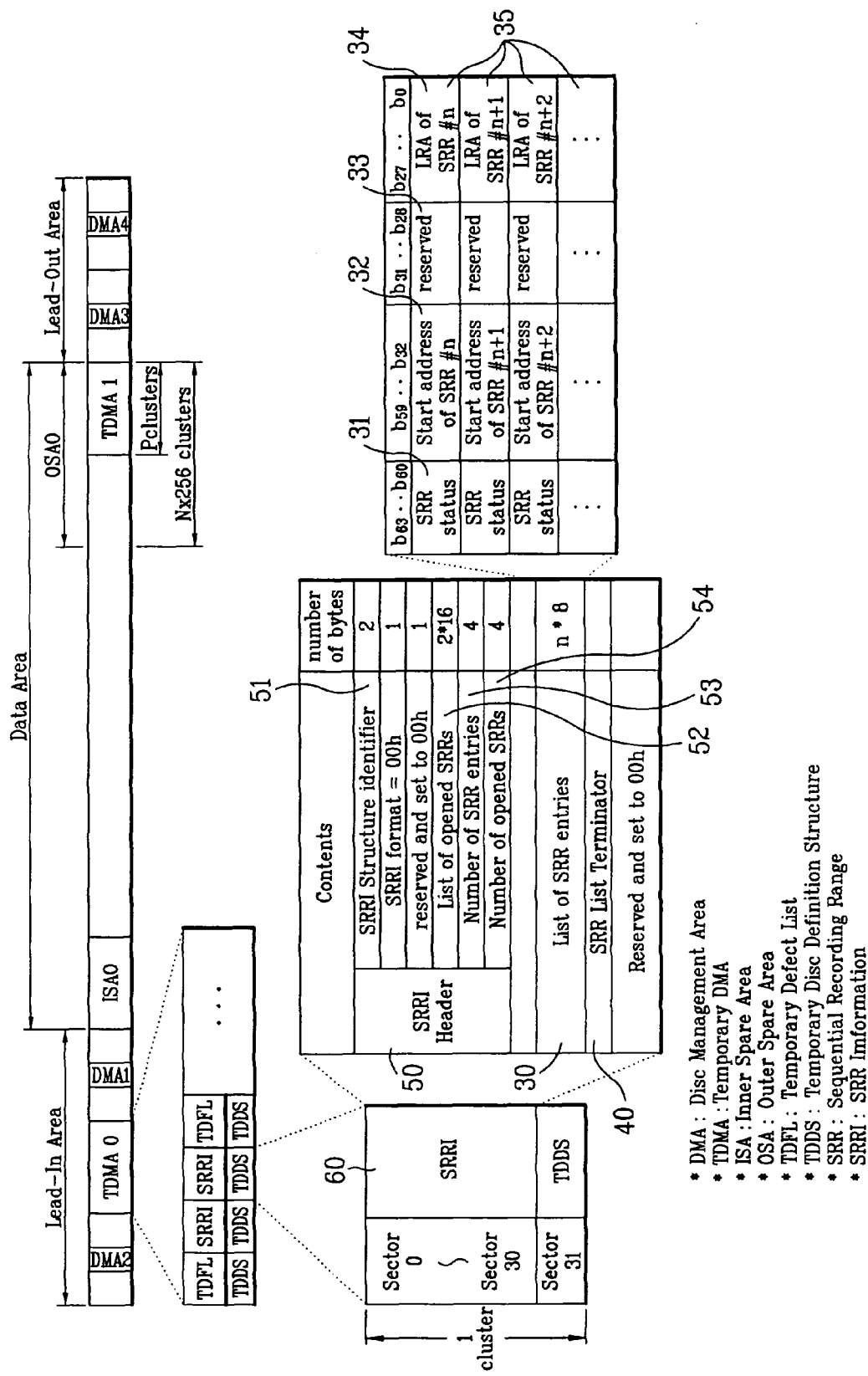

Step 6-2. Close session with padding

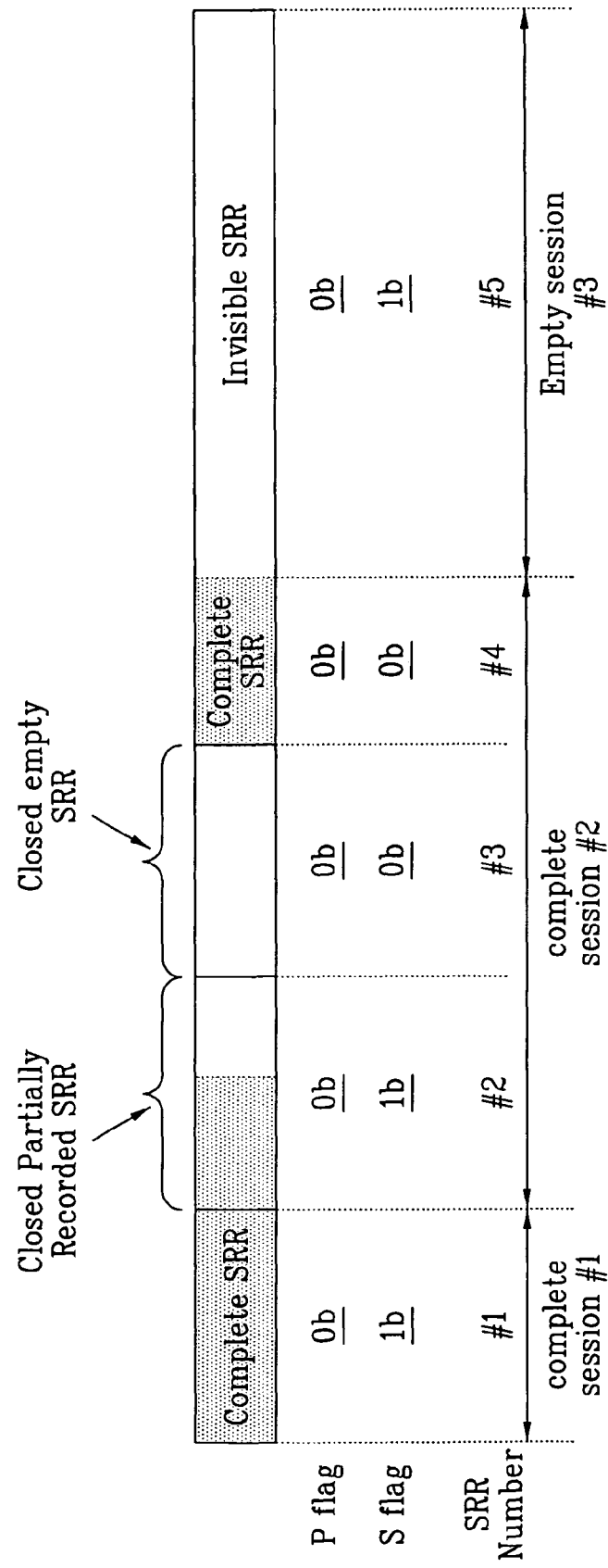

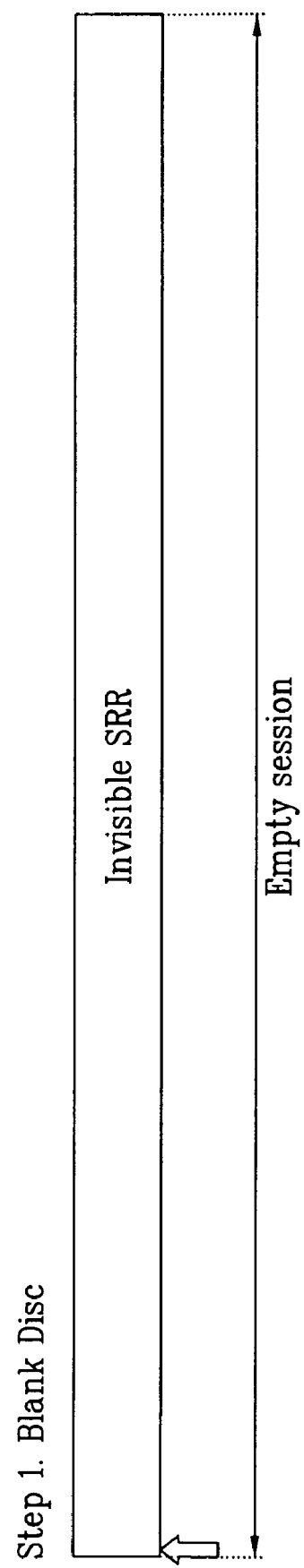

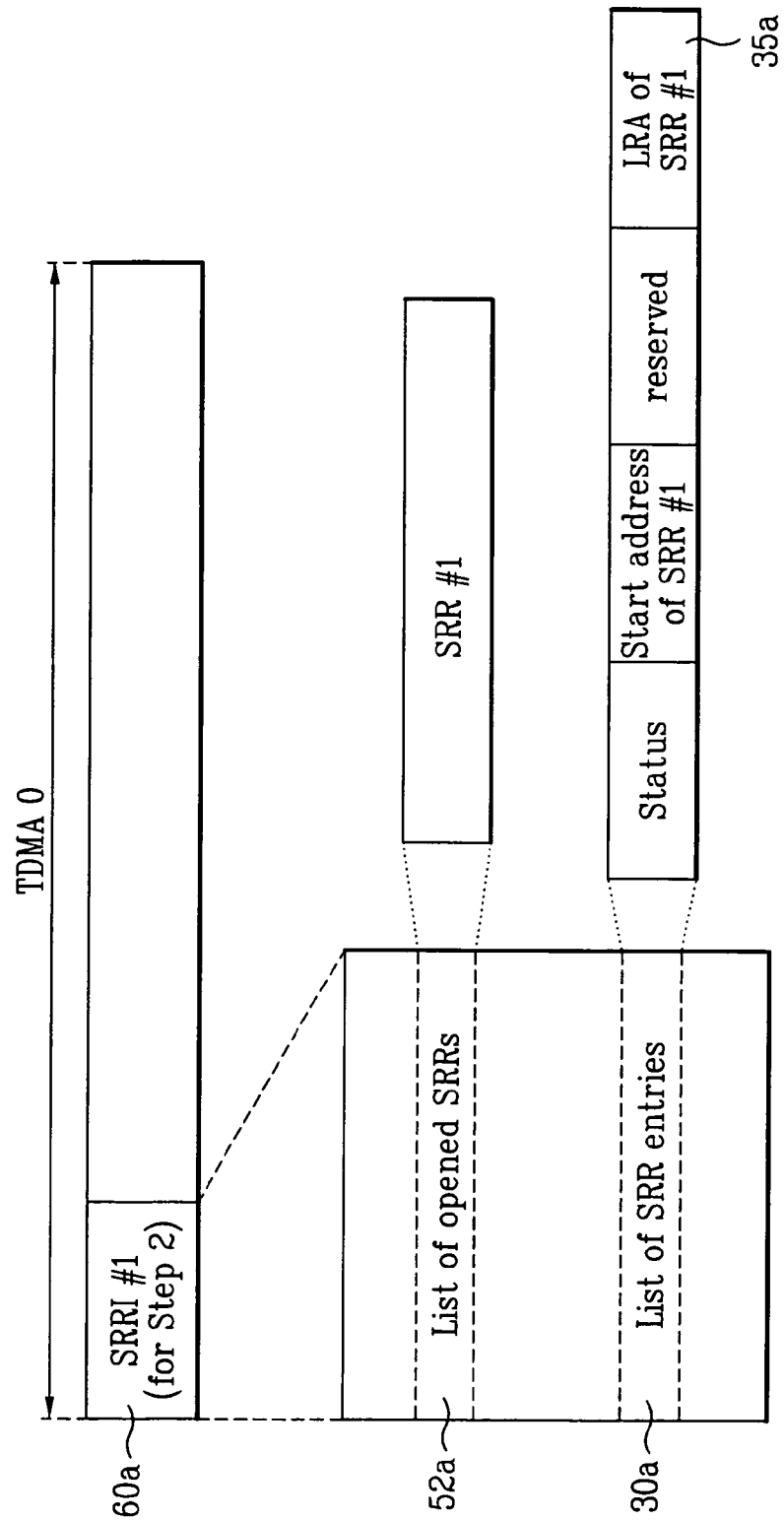

FIG. 7D

| Contents | number of bytes |
|---|---|
| 1st Opened SRR number | 2 |
| 2nd Opened SRR number | 2 |
| ⋮ | ⋮ |
| 16th Opened SRR number | 2 |

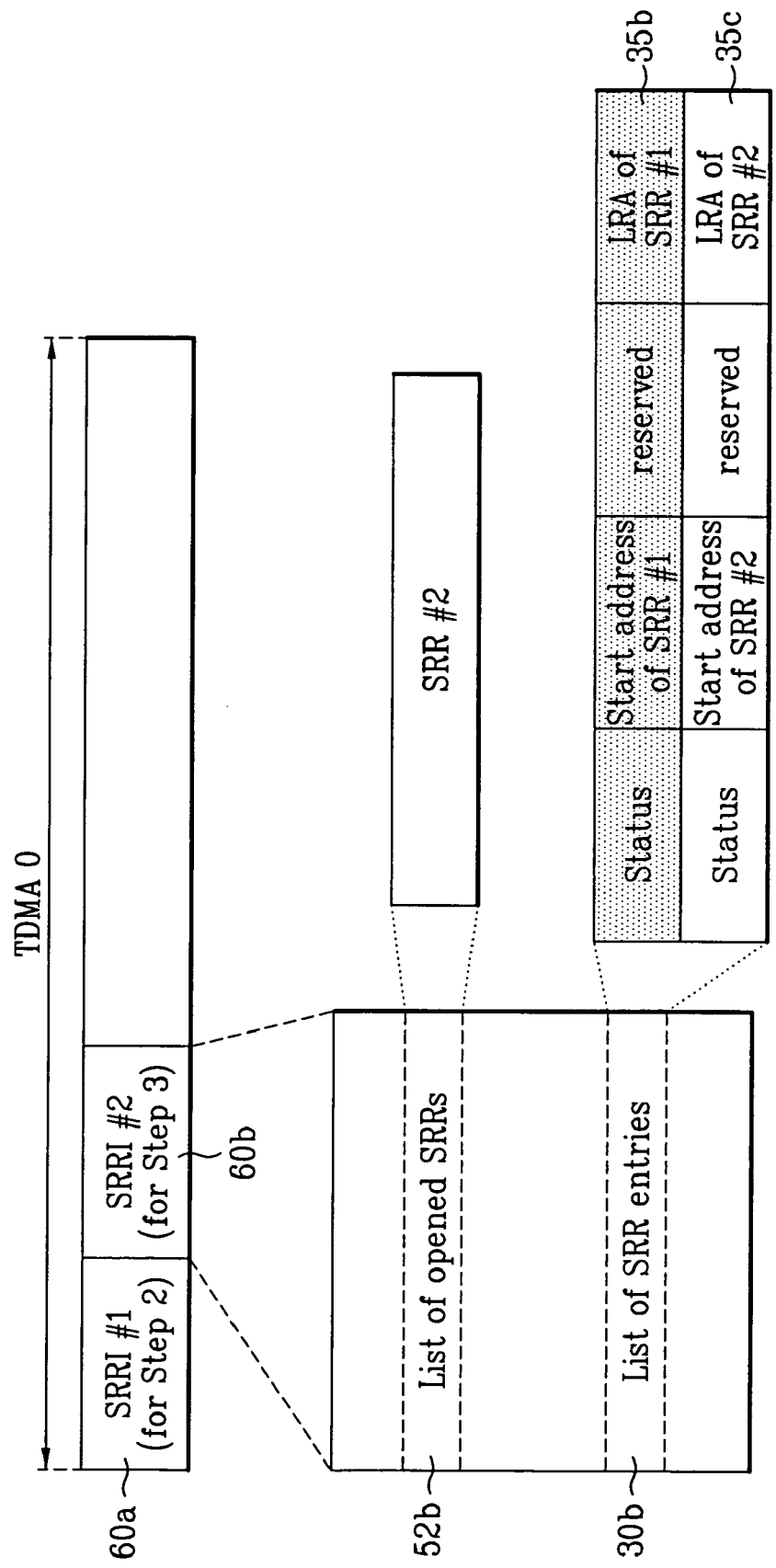

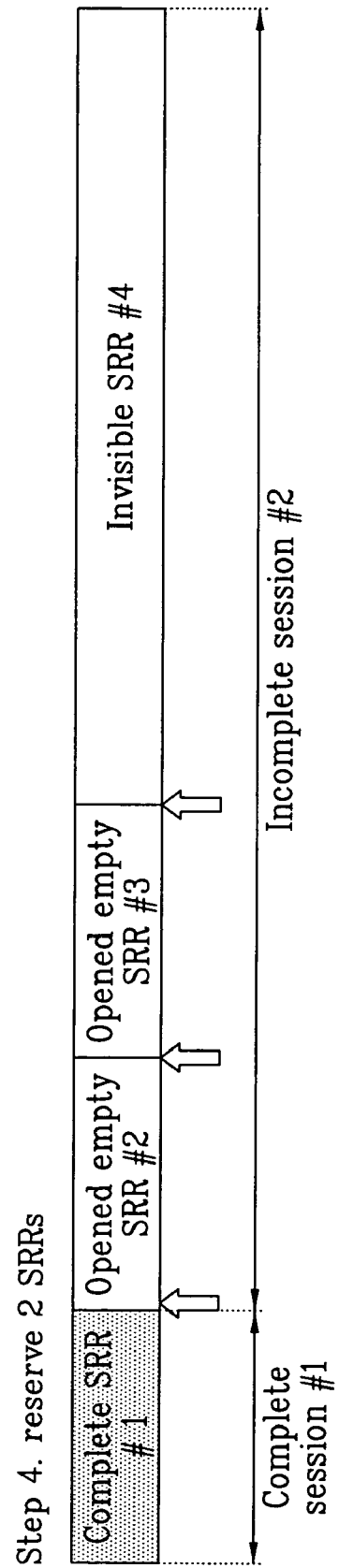

WRITE-ONCE OPTICAL DISC AND METHOD FOR RECORDING MANAGEMENT INFORMATION THEREON

This application claims, under 35 U.S.C. §119, the priority benefit of Patent Application No. 2003-062674 filed in Republic of Korea on Sep. 8, 2003 and No. 2003-071127 filed in Republic of Korea on Oct. 13, 2003. The entire contents of each of these applications are hereby incorporated by reference.

BACKGROUND OF THE INVENTION

1. Field of the Invention

The present invention relates to a write-once optical disc, a method for recording management information on the write-once optical disc, and a recording/playback apparatus using the method.

2. Description of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long term period.

The Blu-ray disc is the next generation HD-DVD technology and the next generation optical recording solution, and has an excellent capability to store data more than the existing DVDs. Recently, a technical specification of international standard for HD-DVD has been established. Related with this, various standards for a write-once Blu-ray disc (BD-WO) are being prepared following the standards for a rewritable Blu-ray disc (BD-RE).

Among the standards for the write-once Blu-ray disc (BD-WO), a method for recording management information has been discussed. This method involves a recording method of an information indicating a recorded status of the disc, which is one of the characteristics of the write-once optical disc.

The information indicating the recorded status of the disc allows a host or a user to easily find a recordable area on the write-once optical disc. In the existing write-once optical discs, this information is named variously. For example, in the case of CD series, this information is named a track information; in the case of DVD series, this information is named an RZone or a fragment.

Accordingly, there is an increasing demand for a method of efficiently recording the management information corresponding to the recorded status of the high-density optical disc. And this method must be provided with the standardized information in order to secure mutual compatibility. In addition, there is a demand for a method of recording the management information on a disc, which can be applied to a write-once high-density optical disc performing defect management, as well as to the Blu-ray discs.

SUMMARY OF THE INVENTION

Accordingly, the present invention is directed to a write-once optical disc and a method for managing the disc that substantially obviate one or more problems due to limitations and disadvantages of the related art.

An object of the present invention is to provide a method and apparatus for recording management information of a write-once optical disc, which are capable of recording and managing the disc recorded status information more efficiently.

Another object of the present invention is to define different types of sequential recording ranges (SRRs) and to provide a method and apparatus for recording the SRRs on SRR information (SRRI).

Another object of the present invention is to provide a structure of a write-once optical disc and a structure of SRRIs that facilitate the recording/playback operations of the disc.

A further object of the present invention is to provide a method of recording SRRI, a method of recovering SRRI, and a recording/playback apparatus, which can be applied to a write-once optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure(s) particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of a write-once optical disc according to an embodiment of the present invention;

FIGS. 6B and 6C illustrate an example of using the SRR entry structure of FIG. 6A according to the second embodiment of the present invention;

DETAILED DESCRIPTION OF THE PREFERRED EMBODIMENTS

Figure 2A:
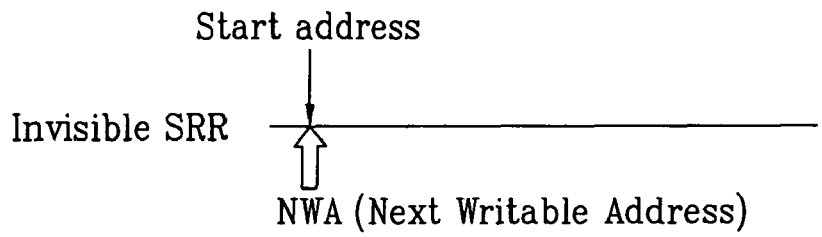
FIGS. 2A to 2D illustrate different types of opened SRRs of the write-once optical disc of FIG. 1 according to the present invention.

Reference will now be made in detail to the preferred embodiments of the present invention, examples of which are illustrated in the accompanying drawings. Wherever possible, the same reference numbers will be used throughout the drawings to refer to the same or like parts.

According to the present invention, a plurality of regions are formed on an optical disc such as a BD-WO and each of these regions is referred to as a "sequential recording range" (SRR). A recording/playback operation is performed on/from these regions. Information indicating the recorded status of the disc will be referred to as "sequential recording range information" (SRRI), meaning it is applied to a sequential recording mode of the disc. The SRRI pertains to one or more SRRs.

FIG. 1 illustrates a structure of a write-once optical disc such as a BD-WO and a method for recording disc management information according to the present invention. The disc shown in FIG. 1 has a single recording layer as an example. But the present invention is not limited to such, and is applicable to a disc having dual or multiple recording layers.

Referring to FIG. 1, the disc includes a lead-in area, a data area, and a lead-out area, all at the recording layer. The lead-in and lead-out areas have a plurality of disc (or defect) management areas (DMA1-DMA4) for storing the same defect management information repeatedly. In the data area, an inner spare area ISA0 and/or an outer spare area OSA0 for replacing defective areas is provided.

It is known that a rewritable optical disc does not have or need a large DMA since its DMA can be written and erased repeatedly, even if the disc has the DMA of a limited size. This is not the case for a write-once optical disc such as a BD-WO. Since the write-once optical disc cannot be re-recorded on the area that was recorded once, the write-once optical disc needs and has a larger management area. To more effectively store management information, in the write-once optical disc the management information is temporarily stored in a temporary disc management area (TDMA). When the disc is ready to be finalized/closed, then the management information stored in a final/latest TDMA is transferred to a DMA for more permanent storage.

As shown in FIG. 1, the disc includes two TDMAs: TDMA0 and TDMA1. The TDMA0 is allocated to the lead-in area and has a fixed, non-variable size. The TDMA1 is allocated to the outer spare area OSA0 and has a size variable in accordance with the size of the spare area. The size P of the TDMA1 may be, for example, P=(N*256)/4 clusters where N is a positive integer, which is about one fourth of the size of the entire outer spare area OSA0.

In each of the TDMA0 and TDMA1, temporary defect list (TDFL) information and temporary disc definition structure (TDDS) information together (TDFL+TDDS) can be recorded in one recording-unit (e.g., one cluster in the case of a BD-WO), or SRRI and TDDS information together (SRRI+TDDS) can be recorded in one recording-unit as shown. The SRRI is recorded when a sequential recording mode is used, whereas SBM (space bit map) is used when a random recording mode is used.

At each update time, (TDFL+TDDS) or (SRRI+TDDS) are recorded to the TDMA in the size of one cluster. In the example of FIG. 1, a TDFL and a TDDS are recorded in one cluster of the TDMA0, an SRRI and a TDDS are recorded in the next cluster of the TDMA0, an SRRI and a TDDS are recorded in the next cluster of the TDMA0, and so on.

If a defective area occurs within the data area, a process of replacing it with the spare area is carried out. The TDFL is the information that manages this process as the defect list. In the case of a single layer disc, the TDFL is recorded with the size of 1 cluster to 4 clusters according to the size of the defect list. Disc status information indicates whether a specific area of the disc is recorded or not-recorded. Specifically, it can be usefully applied to the case where the disc is recorded in a sequential or incremental recording mode. In addition, the TDDS information is generally recorded on the last sector among the 32 sectors within one cluster of the management area. Important information for general management and defect management of the disc is recorded as part of the TDDS information, and the TDDS information is generally always recorded last when the management information is updated within the TDMA.

The present invention provides a method of recording a recorded status information of a disc in a new high-density optical disc such as a BD-WO. Specifically, SRRI is used as the recorded status information that indicates the recorded status of the disc. Each SRRI pertains to one or more SRRs (recording regions) on the disc. The present invention defines various types of SRRs, which will be discussed later referring to FIGS. 2A to 3E. The structure of the SRRI according to the present invention will be now described with reference to FIG. 1.

As shown in FIG. 1, each SRRI 60 in the TDMA(s) generally includes three parts: a header 50 for identifying the corresponding SRRI, a list of SRR entries (SRR entry list) 30 including SRR type information, and an SRR list terminator 40 for indicating the termination of the corresponding SRRI.

The SRRI header 50 is located at the head of the corresponding SRRI 60 and includes an "SRRI structure identifier" field 51 for making the SRRI identifiable, a "List of opened SRRs" field 52 for identifying the location of each opened SRR pertaining to the current SRRI, a "Number of SRR entries" field 53 for identifying the total number of SRRs, and a "Number of opened SRRs" field 54 for identifying the total number of opened SRRs. The "List of opened SRRs" field 52 stores SRR numbers (identifications) of the opened SRRs.

By accessing the SRRI header 50, the general contents of the entire SRRI 60 can be known without having to access the SRR entry list 30 directly. It is possible to newly define any new SRR types or other necessary information and to insert this information into the header 50 as needed.

The SRR entry list ("List of SRR entries") 30 is recorded after the SRRI header 50. When the SRR entry list 30 is terminated, the termination of the SRR entry list 30 is identified with the SRR list terminator ("SRR List Terminator") 40. Specifically, the SRR list terminator 40 is information identifying the termination of the corresponding SRRI when the SRRI has a variable size.

The SRR entry list 30 is a list in which a plurality of SRR entries 35 are collected. Eight (8) bytes (or 64 bits) are allocated to each SRR entry 35, and one SRR entry 35 represents information on one SRR on the disc. Each SRR entry 35 includes an SRR status field 31, a start address field 32 for storing a start address of the corresponding SRR, a reserved area 33, and a last recorded address (LRA) field 34 for storing the LRA of the corresponding SRR.

According to an embodiment, the first 4 most significant bits ($b63$-$b60$) among the 64 bits of the SRR entry 35 are allocated to the SRR status field 31, the next 28 bits ($b59$-$b32$)

of the SRR entry 35 are allocated to the start address field 32, the next 4 bits (b31-b28) of the SRR entry 35 are allocated to the reserved area 33, and the last 28 bits (b27-b0) of the SRR entry 35 are allocated to the LRA field 34.

Accordingly, as the management information of the disc, the SRRI includes the header, the list of SRR entries and the SRR list terminator, and all such information is recorded collectively at each updating instance.

One of the objects of the present invention is to define and distinguish various types of SRRs formed within the disc and to use them to record/playback to/from the disc. Therefore, according to the present invention, the types of the SRRs will be defined and the method of recording an information that distinguishes the types of the SRRs within the SRRI will be described now in detail.

Particularly, an SRR is an area reserved for recording data or information on a write-once optical disc such as a BD-WO. The present invention defines the types of the SRRs according to necessity and/or a recording progress. The detailed description of various SRR types that are defined by the present invention, is provided as follows referring to FIGS. 2A-3E.

FIGS. 2A to 2D illustrate different types of opened SRRs for the write-once optical disc (e.g., a BD-WO) according to the present invention. An opened SRR means an SRR that can be recordable on the corresponding area. "Recordable" means that the SRR has a next writable address (NWA). Accordingly, the opened SRR is an SRR with an NWA. An unrecordable SRR without NWA is a closed SRR. That is, the closed SRR is an SRR that cannot be recordable or has no NWA. The closed SRR types will be described later referring to FIGS. 3A to 3E.

More specifically, FIG. 2A illustrates an invisible SRR among the opened SRRs. The invisible SRR is generally always formed at the outermost section of the disc or to the initial blank disc and means a non-recorded region. In other words, the invisible SRR has only a start address but has no end to its area. Since recording is not performed in the invisible SRR, its LRA is zero. The NWA of the invisible SRR becomes the same value as its start address.

Figure 2B:
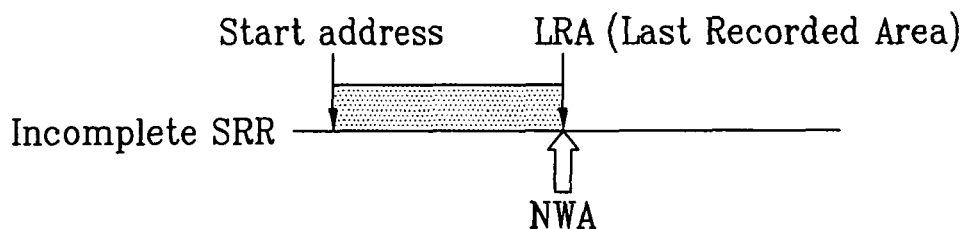

FIG. 2B illustrates an incomplete SRR among the opened SRRs. The incomplete SRR is an SRR in which recording is performed to some portion of the SRR while the SRR is in the invisible SRR status. In other words, the incomplete SRR has only a start address but has no end to its area. Since the recording is performed to some portion of the SRR, the LRA of the incomplete SRR is a last recorded area on which normal data is recorded. Therefore, the NWA of the incomplete SRR is an address next to (or following) the LRA of the SRR.

Figure 2C:
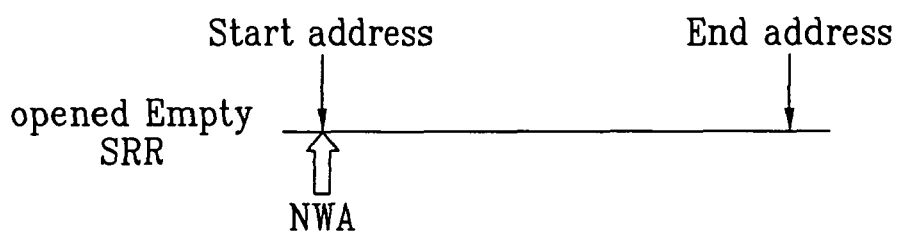

FIG. 2C illustrates an empty SRR among the opened SRRs. Unlike the invisible SRR and the incomplete SRR of FIGS. 2A and 2B, the empty SRR is an SRR that is generally formed at an intermediate area of the disc, not at the outermost area of the disc, for recording. In other words, it is a case where the recording is not yet performed after the opened SRR is formed for a host or user's recording. The empty SRR has both a start address and an end address. However, since the empty SRR indicates the pre-recording state, the LRA is zero and the NWA has the same value as the start address of the SRR.

Figure 2D:
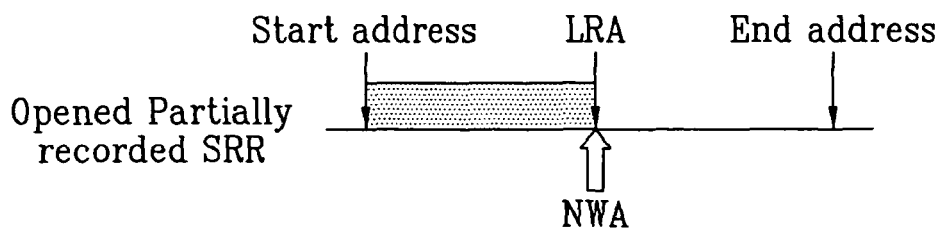

FIG. 2D illustrates a partially recorded SRR among the opened SRRs. The partially recorded SRR is an SRR in which recording is performed to some portion of the SRR while the SRR is in the empty SRR status shown in FIG. 2C. Therefore, the partially recorded SRR has both a start address and an end address. Since the recording is performed to some portion of the SRR, the LRA of the partially recorded SRR is a last recorded area address and the NWA is an address next to the LRA.

According to an embodiment of the present invention, the number of opened SRRs that is allowed is advantageously limited to a predetermined number, since it is difficult to manage a large number of opened SRRs on the write-once optical disc. For example, in the case of BD-WOs, the total number of opened SRRs that is allowed at a given time is maximum sixteen. Information on the location and number of opened SRRs within the disc can be obtained by checking the "List of opened SRRs" field 52 and the "Number of opened SRRs" field 54 within the SRRI header 50 of FIG. 1.

FIGS. 3A to 3E illustrate different types of closed SRRs for a write-once optical disc such as a BD-WO according to the present invention. A closed SRR is an SRR that is non-recordable and "non-recordable" means that the SRR has no NWA. Therefore, the closed SRR can be formed by completing the recording of the SRR. Even if a recordable area remains in the SRR, the SRR may be forcibly closed by a user/host's close command.

Figure 3A:
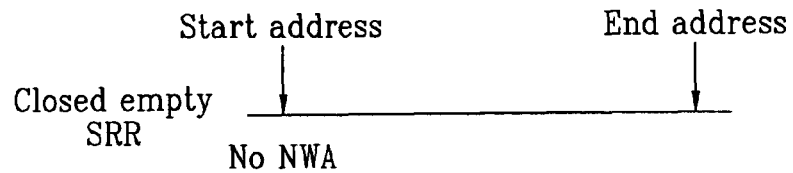
FIGS. 3A to 3E illustrate different types of closed SRRs of the write-once optical disc of FIG. 1 according to the present invention.

More specifically, FIG. 3A illustrates an empty SRR among the closed SRRs. The empty SRR is an SRR that is closed by a close command with no recording to the SRR when the SRR is in the empty SRR state shown in FIG. 2C. In this regard, FIG. 3A is an example of a closed empty SRR and FIG. 2C is an example of an opened empty SRR.

Figure 3B:
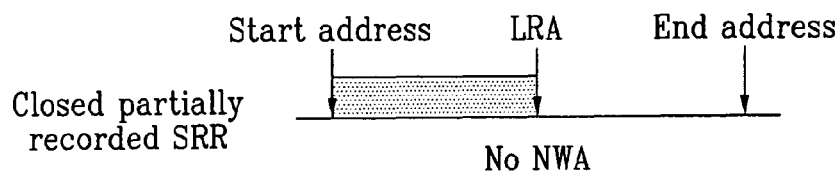

FIG. 3B illustrates a partially recorded SRR among the closed SRRs. The partially recorded SRR is an SRR that is closed by a close command with no additional recording to the SRR when the SRR is in the partially recorded SRR state shown in FIG. 2D. In this regard, FIG. 3B is a closed partially recorded SRR and FIG. 2D is an opened partially recorded SRR.

Figure 3C:
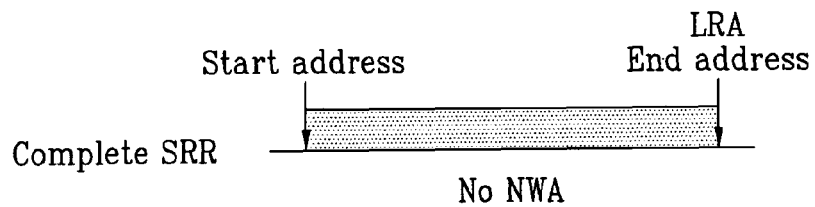

FIG. 3C illustrates a complete SRR among the closed SRRs. The complete SRR is an SRR in which a normal user data recording is completed to the end of the SRR. The complete SRR exists only among the closed SRRs.

Figure 3D:
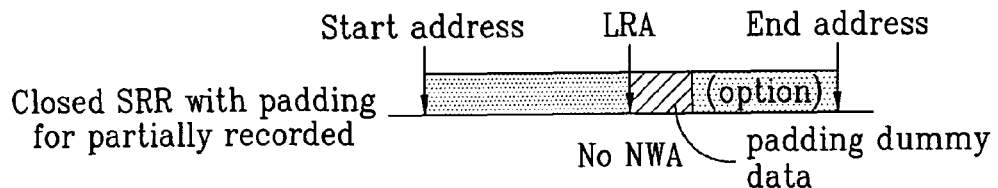

FIG. 3D illustrates another example of a closed partially recorded SRR among the closed SRRs. This SRR type involves an SRR that is closed after some recordable area (after the LRA) of the SRR is padded with specific dummy data when closing the opened partially recorded SRR of FIG. 2D. The entire area or some area of the recordable area of the SRR can be padded with the dummy data. As a variation, specific character code (ASCII characteristic) instead of the dummy data can be used to pad the SRR. The padding data can be used to indicate that the SRR is closed. In one example, the specific character as the padding data may be "CLSD" indicating that the corresponding SRR is closed. In another example, dummy data of zero can be used such that if an SRR with such dummy data is detected, this SRR can be determined to be a closed SRR. When padding the opened SRR to close it, at least part of the recordable area of the SRR may be recorded with the padding data. This part of the SRR may be at least one recording-unit such as one cluster, and can be the first cluster after the LRA. That is, at least one recording-unit of the opened SRR starting from its NWA can be padded when closing the opened SRR.

Figure 3E:
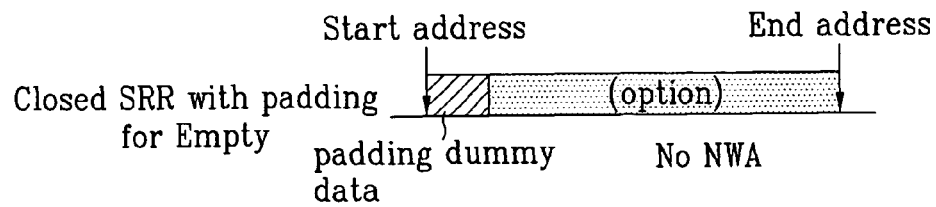

FIG. 3E illustrates another example of a closed empty SRR among the closed SRRs. This SRR type involves an SRR that is closed after some recordable area of the SRR is padded with padding data when closing the opened empty SRR of FIG. 2C. The padding operation in FIG. 3D as discussed above is applied herein.

As shown in FIGS. 3A-3B and 3D-3E, when an opened SRR is changed into a closed SRR by a close command, the case that the non-recorded area is closed without padding (FIGS. 3A and 3B) and the case that the non-recorded area is closed with padding (FIGS. 3D and 3E) are defined differently.

Also, the case that the SRR is closed without padding and the case that the SRR is closed after padding it with specific padding data can be selectively accomplished. In the case of existing Blu-ray discs, the non-recorded area is compatible with the playback-only disc even without padding. The recording/playback apparatus (FIG. 14) can selectively perform the padding operation, thereby securing the degree of freedom in the structure/operation of the recording/playback apparatus effectively. Further, in the padding operation, a recording/playback part (e.g., the component 10 in FIG. 14) of the recording/playback apparatus can prestore the padding data and automatically record it an SRR as needed. This reduces the padding operation time, compared to when a controller transmits the padding data and the padding occurs thereafter.

Further, if a portion (e.g., a first cluster after the LRA) of the recordable area within the SRR is padded with specific data in the closing of the SRR, it is possible to validly restore the current disc status even when a loss of the SRRI is present. A detailed description about this feature of the invention will be made later with reference to FIGS. 7A to 13B.

FIGS. 4A to 4G illustrate an example of a process of forming SRRs within the disc of FIGS. 1-3E according to an embodiment of the present invention. In these and other figures, a portion indicated by a thick arrow represents a NWA location. Herein, different types of sessions will be defined and described together according to the present invention.

A "session" is an upper-level recording-unit compared to the lower-level recording-unit such as an SRR, and includes at least one SRR. Also, since only one recordable session may be present within the disc at a given time, a new session must be allocated after all previously allocated sessions are closed. Accordingly, in case a session is closed, all SRRs existing within that session must be closed together. Also, each SRR can be closed by padding the entire area or some area of the recordable area within the SRR, or can be closed without padding the recordable area of the SRR, as discussed above. This operation can be selectively performed by the optical recording/playback apparatus.

Sessions can be classified into different types: an empty session having only an invisible SRR; an incomplete session having at least one opened SRR except for an invisible SRR; and a complete session having only one or more closed SRRs.

Figure 4A:
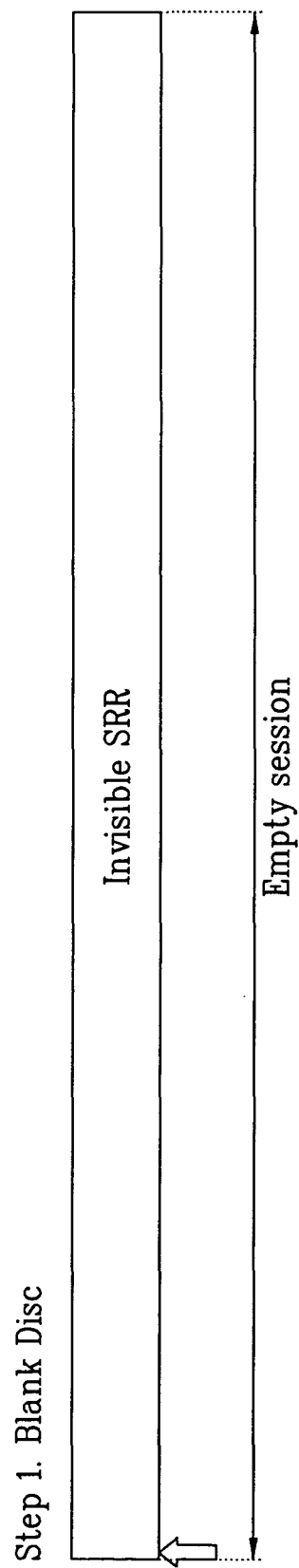
FIG. 4A to 4G illustrate an example of a process of generating SRR(s) and session(s) of the write-once optical disc of FIGS. 1-3E according to an embodiment of the present invention.

Particularly, FIG. 4A illustrates an initial blank disc that is in a recordable status all over the entire area. A start location of the disc becomes the NWA. In such a state, only one SRR is present on the disc. This is the same as the invisible SRR shown in FIG. 2A. Therefore, the session here has a disc initial status in which only one empty session is present.

Figure 4B:
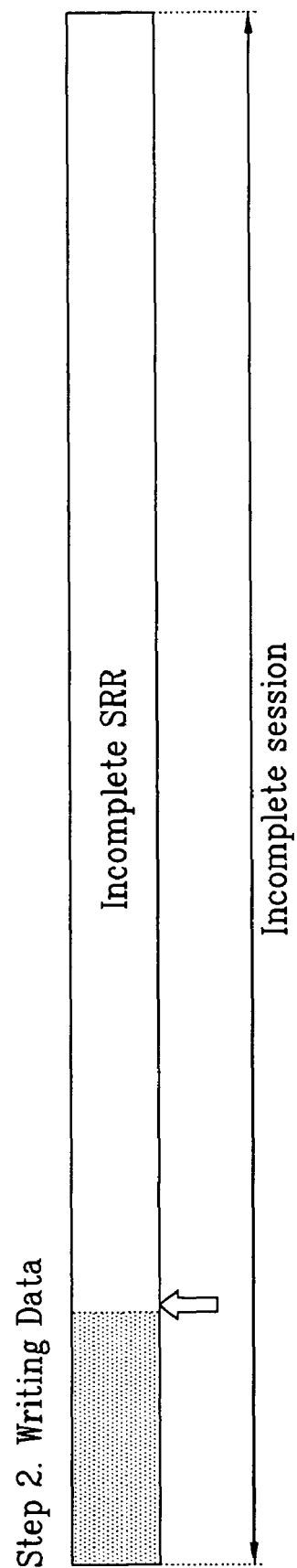

FIG. 4B illustrate a case when some portion of the blank disc of FIG. 4A is recorded or the session of FIG. 4A is not closed. In such a state, only one SRR is present on the disc. This is the same as the incomplete SRR shown in FIG. 2B. Therefore, the session here is in a status where only one incomplete session is present.

Figure 4C:
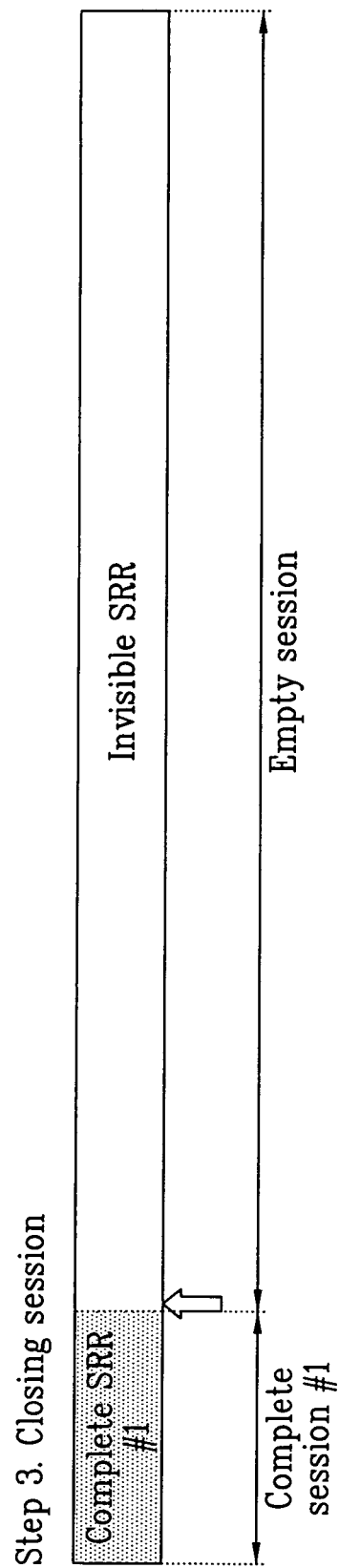

FIG. 4C illustrates a case when a session close command is executed when the disc is in the state of FIG. 4B. At this time, the existing data recorded area is separated into an independent closed SRR by the session close command and a new (empty) session is created. In other words, the entire recorded area in FIG. 4B becomes a complete SRR #1 which in turn constitutes a complete session #1. The non-recorded area then becomes an invisible SRR (shown in FIG. 2A) which in turn constitutes an empty session.

Figure 4D:
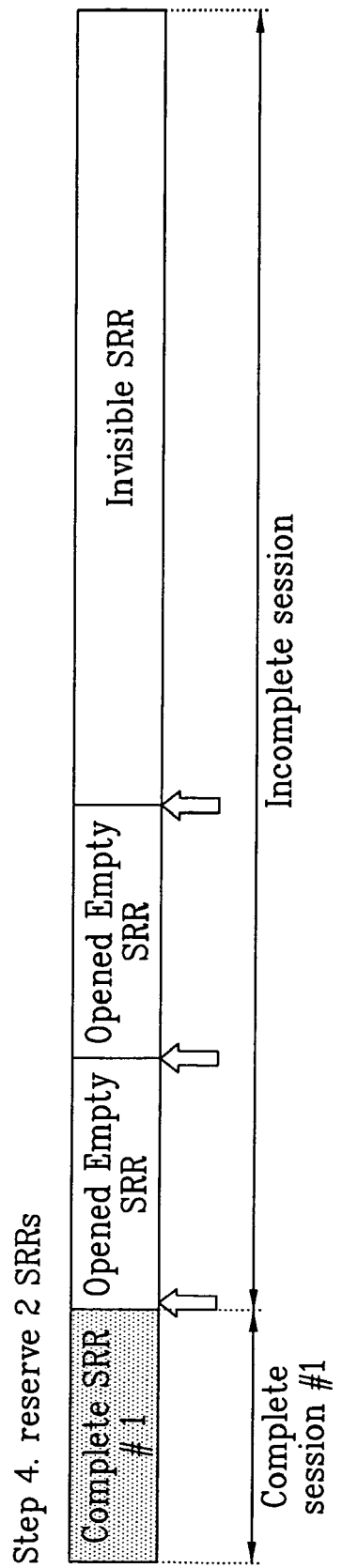

FIG. 4D illustrates a case when two opened SRRs are reserved in the empty session of FIG. 4C. Each new reserved opened SRR becomes the empty SRR and has a NWA. The remaining area of the empty session forms an invisible SRR. As a result, the empty session of FIG. 4C changes to an incomplete session.

Figure 4E:
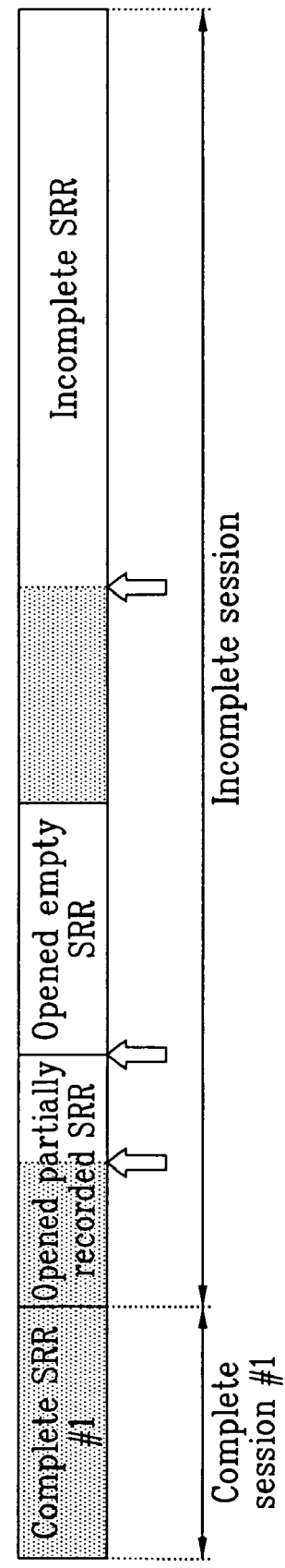

FIG. 4E illustrates a case when data is recorded in the first empty SRR and the invisible SRR of FIG. 4D. Due to the recording, the first empty SRR changes to an opened partially recorded SRR and the invisible SRR changes to an incomplete SRR.

Figure 4F:
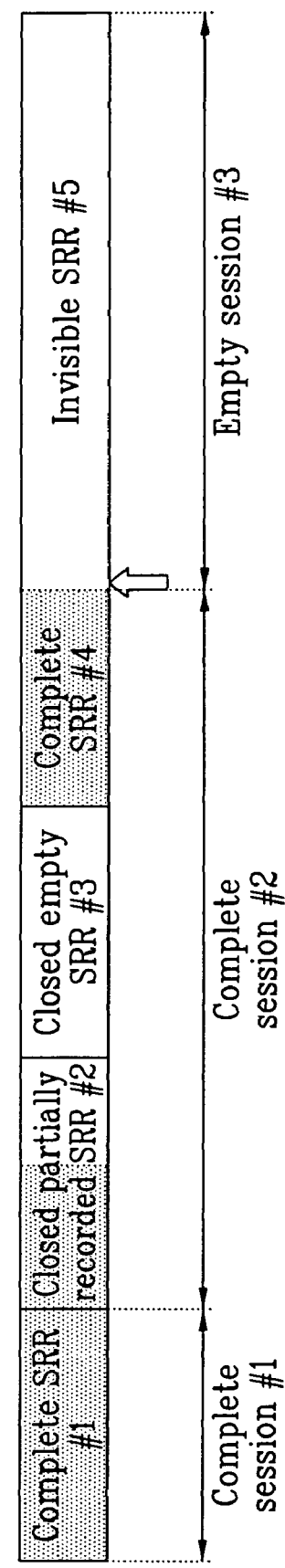

FIG. 4F illustrates a case when a session close command is executed from the state of FIG. 4E, but non-recorded area(s) of the session is closed without padding. When closing the session, all SRRs contained in that session must be closed. For instance, the existing data recorded area of the incomplete session of FIG. 4E becomes an independent complete session (complete session #2) by the session close command. All SRRs contained in the complete session #2 change to closed SRRs to form a closed partially recorded SRR #2, a closed empty SRR #3 and a complete SRR #4. The remaining outermost SRR becomes an invisible SRR #5 as an opened SRR, and a newly reserved empty session #3 having the invisible SRR #5 is created.

Figure 4G:
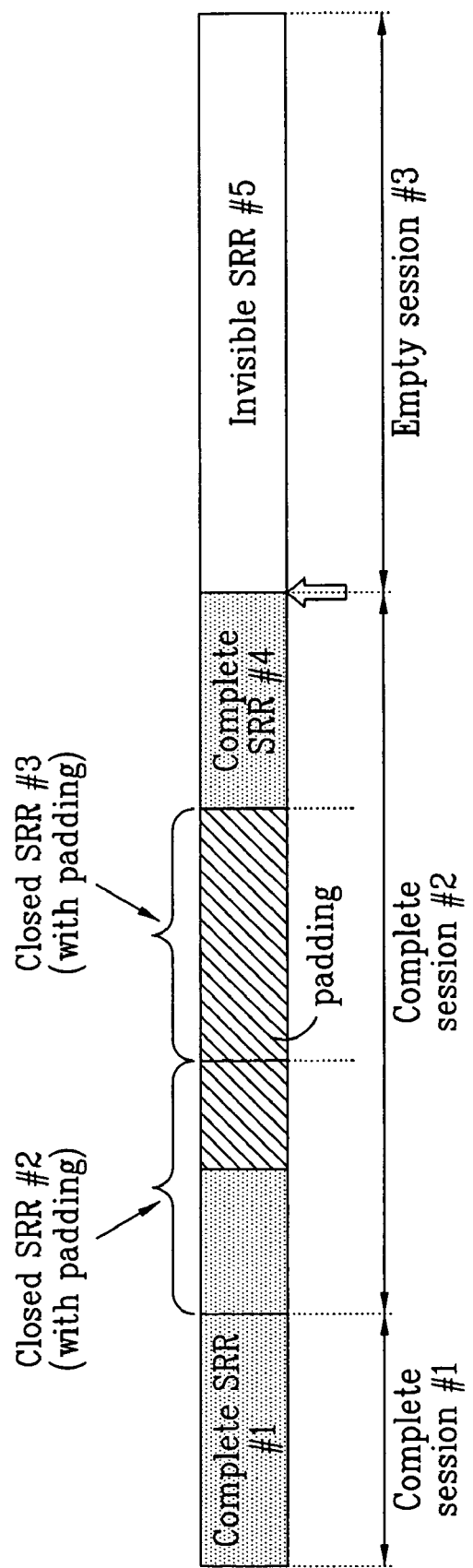

FIG. 4G illustrates another case when a session close command is executed from the state of FIG. 4E, but non-recorded area(s) of the session is closed with padding. That is, the present process can proceed from the state of FIG. 4E to the state of either FIG. 4F or 4G. Referring to FIG. 4G, the existing data recorded area of the incomplete session of FIG. 4E becomes an independent complete session #2 by the session close command. After some or all of the remaining areas of the complete session #2 are padded with dummy data or specific character data as discussed above, all SRRs contained in the complete session #2 change to closed SRRs. As a result of the padding, three types of closed SRRs are reserved within the complete session #2. They are: a closed SRR #2 that is changed from the opened partially recorded SRR to the closed SRR after the padding; a closed SRR #3 that is changed from the opened empty SRR to the closed SRR after the padding; and a complete SRR #4 that is changed to the closed SRR since the physical user data is normally recorded. Although FIG. 4G shows that the entire recordable areas are padded in the closing of the SRRs, the present invention covers a scenario where only a portion (e.g., a first part or cluster after the LRA) of an SRR may be padded.

According to the present invention, when the SRRs are closed, different types of SRRs may be created depending on whether or not a padding operation is performed to the SRRs as shown in FIG. 4F or 4G. Therefore, there is need for a method of recording new SRR information, which can distinguish the defined types of SRRs in order to correctly indicate the recorded status of the disc.

Hereinafter, a method for identifying the type of an SRR will be described. For the convenience of explanation, this method-as applied to the SRR entry within the SRRI of FIG. 1 will be described. The SRR type identification according to the present invention is performed according to the padding of the closed SRR, and it is apparent that various modifications and variations can be made in the present invention.

Figure 5A:
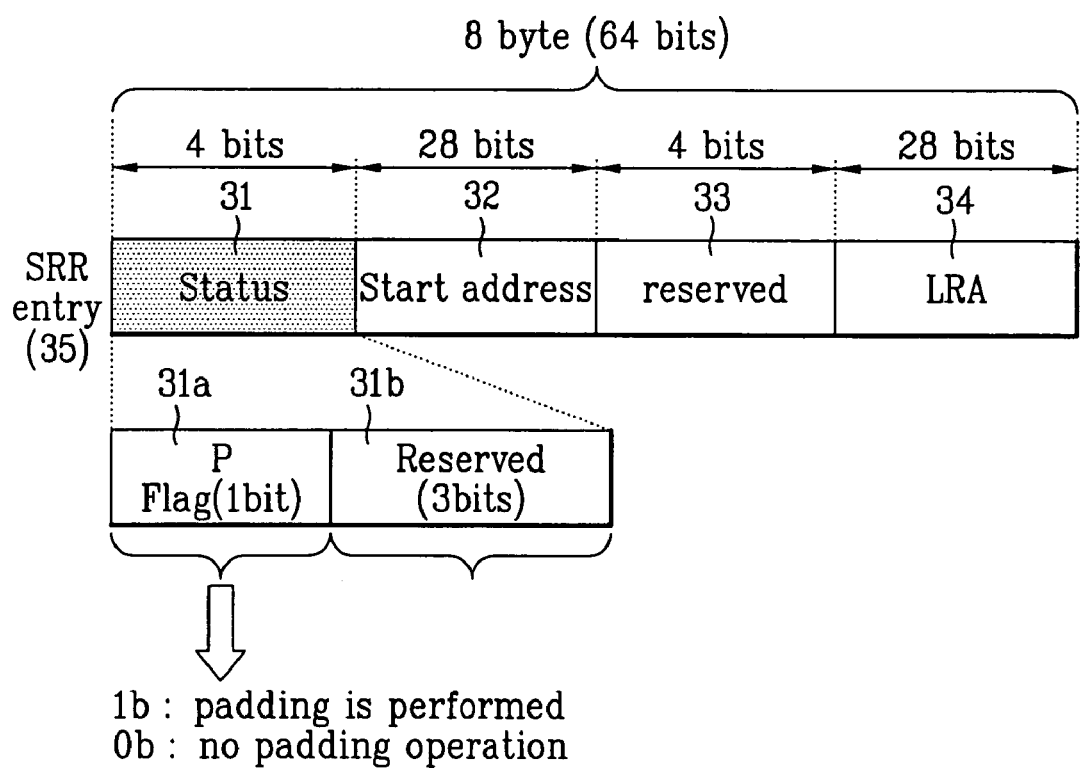
FIG. 5A illustrate an example of a structure of an SRR entry according to a first embodiment of the present invention.

FIG. 5A illustrates a first embodiment of the SRR entry according to the present invention. The SRR entry structure of FIG. 5A is applied to each SRR entry 35 of FIG. 1, but can be applied to any other SRR entry of a disc. As shown, the SRR entry 35 includes a SRR status field 31, a start address field 32, a reserved area 33 and an LRA field 34 as discussed above. The SRR status field 31 carries therein 4-bit SRR status information used to distinguish whether the corresponding SRR is closed with padding or without padding.

Particularly, 1 bit (31a) of the 4-bit SRR status information in the SRR status field 31 is used as a padding flag (hereinafter, referred to as a "P-flag") for identifying whether or not the padding is performed to the corresponding SRR, and the other 3 bits (31b) of the SRR status field 31 are a reserved area for coping with future modifications in the standard as needed. In the example, the first bit (b63) of the SRR status field 31 carries the P-flag and the remaining three bits (b62-b60) of the SRR status field 31 function as the reserved area. However, other variations are possible.

In the example, if the P-flag has a value of "1b", it means that the corresponding SRR is a closed SRR in which the padding has been performed. If the P-flag has a value of "0b", it means that the corresponding SRR is an SRR in which no padding has been performed. Other values may be used in the P-flag. Accordingly, if the P-flag has the value "0b", the corresponding SRR can be an opened SRR or a closed SRR. However, if the corresponding SRR is an SRR that is registered in the "List of opened SRRs" field 52 within the SRRI header 50, it means it is an opened SRR, but if it is not registered, then it means it is a closed SRR.

In the start address field 32 of the SRR entry 35, the address corresponding to the start location of the corresponding SRR is recorded. Generally, it is represented with a physical sector number (PSN). The reserved area/field 33 of the SRR entry 35 is provided for future modifications in the standard as needed.

The LRA field 34 of the SRR entry 35 provides an LRA information of the corresponding SRR. That is, an information on the end address of the actually recorded user data (except for the padding data) of the corresponding SRR is recorded. In other words, in the case of a complete SRR, the end addresses of the LRA and the SRR accord with each other. However, in the case of a partially recorded SRR, the end addresses of the LRA and the SRR do not accord with each other. An LRA is an address of an area where the physical user data are recorded. Even if specific padding data are recorded in the SRR by the padding operation, the LRA value of the SRR is not changed. Also, in the case of an empty SRR, the LRA of the SRR becomes zero because there is no area where the physical user data are recorded.

Figure 5B:
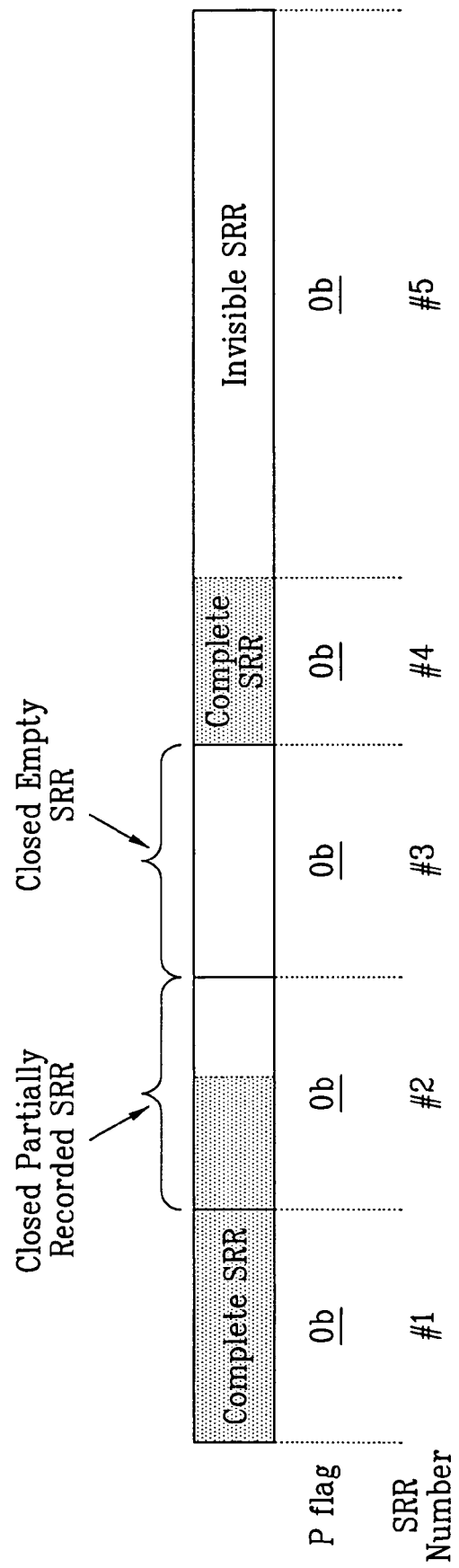
FIGS. 5B and 5C illustrate an example of using the SRR entry structure of FIG. 5A according to the first embodiment of the present invention.
Figure 5C:
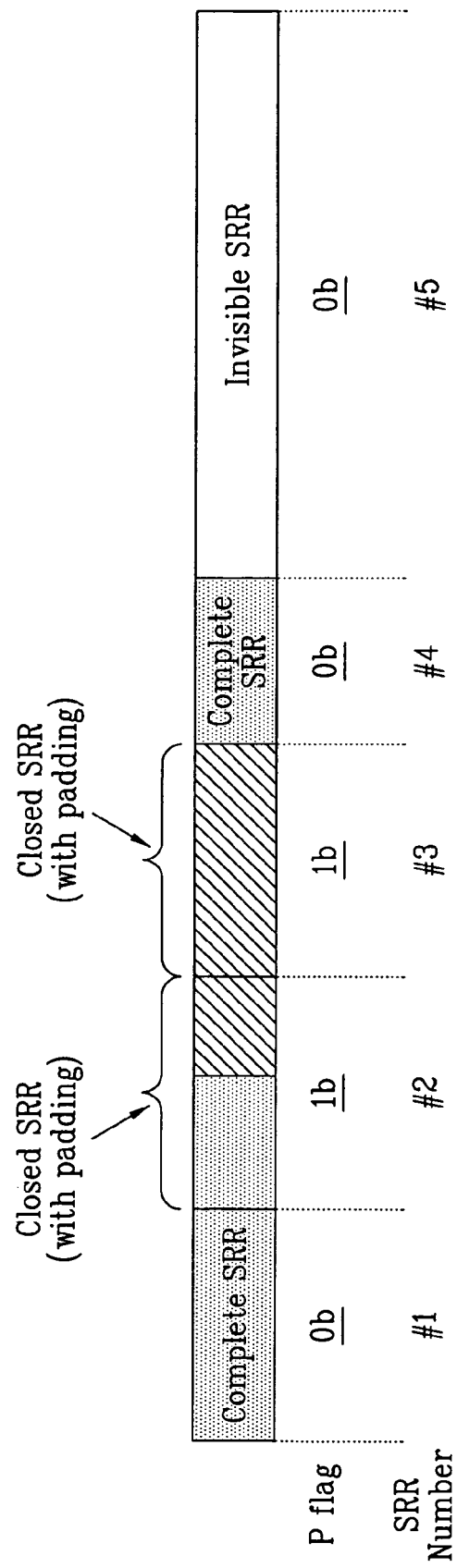

FIGS. 5B and 5C illustrate two different examples of recording the P-flag of FIG. 5A based on the method of creating the SRR entry according to the first embodiment of the present invention. For the convenience of explanation, FIG. 5B illustrates the case of FIG. 4F in which no padding is performed in the closing of the SRR(s), and FIG. 5C illustrates the case of FIG. 4G in which padding is performed in the closing of the SRR(s).

Referring to FIG. 5B, in this example, SRR numbers #1 to #5 are given to five SRRs in sequence, respectively. The SRR #1 is a complete SRR without padding, which is indicated in the corresponding SRR entry by the P-flag of "0b". The SRR #2 is a closed partially recorded SRR without padding, which is indicated in the corresponding SRR entry by the P-flag of "0b". The SRR #3 is a closed empty SRR without padding, which is indicated in the corresponding SRR entry by the P-flag of "0b". The SRR #4 is a complete SRR without padding, which is indicated in the corresponding SRR entry by the P-flag of "0b". The SRR #5 is an invisible SRR without padding, which is indicated in the corresponding SRR entry by the P-flag of "0b".

In the case of FIG. 5B, all SRRs have no padding as indicated by the P-flags of "0b". The opened SRR is only the SRR #5 (invisible SRR). Therefore, only the SRR #5 is recorded in the "List of opened SRRs" field 52 of the SRRI header 50 as "1st opened SRR" among the maximum 16 possible opened SRRs. The remaining "2nd to 16th opened SRR" fields of the field 52 (FIG. 7D) are set to zero.

Referring to FIG. 5C, again, SRR numbers #1 to #5 are given to five SRRs in sequence, respectively. The SRR #1 is a complete SRR without padding, which is indicated in the corresponding SRR entry by the P-flag of "0b". The SRR #2 is a closed partially recorded SRR with padding, which is indicated in the corresponding SRR entry by the P-flag of "1b". The SRR #3 is a closed empty SRR with padding, which is indicated in the corresponding SRR entry by the P-flag of "1b". The SRR #4 is a complete SRR without padding, which is indicated in the corresponding SRR entry by the P-flag of "0b". The SRR #5 is an invisible SRR without padding, which is indicated in the corresponding SRR entry by the P-flag of "0b".

In the case of FIG. 5C, three SRRs #1, #4 and #5 have no padding as indicated by the P-flags of "0b". Two SRRs #2 and #3 have padding as indicated by the P-flags of "1b". The opened SRR is the SRR #5 (invisible SRR). Therefore, only the SRR #5 is recorded in the "List of opened SRRs" field 52 of the SRRI header 50 as "1st opened SRR". The remaining "2nd to 16th opened SRR" fields of the field 52 are set to zero.

Accordingly, by defining the P-flag within the SRR status field of the SRR entry as in the first embodiment, different types of closed SRRs can be further distinguished. The LRA and start address information are present within the SRR entry. For example, as can be seen in FIGS. 3C, 3D and 3E, among these closed SRRs, the SRRs can be distinguished from each other because the locations of the LRAs are different from each other. However, comparing FIGS. 3B and 3D, the closed SRRs have the same LRAs. In this case, SRR type identification through the LRA is difficult. In such cases, it may be necessary to distinguish the SRRs according to the padding operation using the P-flags. Similarly, in FIGS. 3A and 3E, the types of the SRRs can be distinguished according to the padding operation using the P-flags.

According to an embodiment of the present invention, in order to distinguish the types of SRRs, there is a method of directly representing the presence or absence of the padding within the padded cluster of the SRR, without recording the information on the presence of the padding using the P-flag in the SRR entry. It is apparent that such a method is included within the scope of this invention. In such a method, the presence or absence of predetermined padded data (e.g., dummy data or specific real data) in an SRR may be looked for to distinguish the type of that SRR.

Figure 6A:
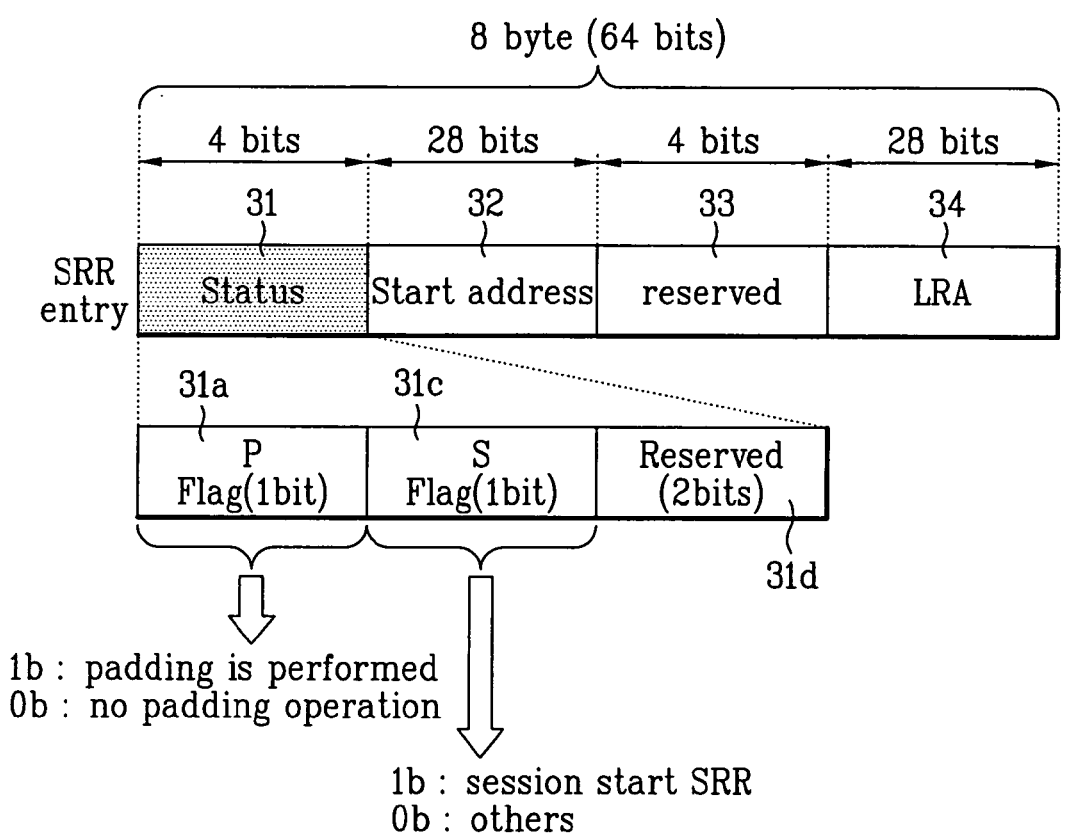
FIG. 6A illustrate an example of a structure of an SRR entry according to a second embodiment of the present invention.

FIG. 6A illustrates a second embodiment of the SRR entry according to the present invention. The SRR entry structure of FIG. 6A is applied to each SRR entry 35 of FIG. 1, but can be applied to any other SRR entry of a disc. As shown, the SRR entry 35 includes a SRR status field 31, a start address field 32, a reserved field 33 and an LRA field 34 as discussed above. Specifically, 4-bit SRR status information is stored in the SRR status field 31 and is used to distinguish whether the corresponding SRR is closed with padding or without padding and to distinguish whether or not the corresponding SRR is the start SRR of a session. But, since the start address field and the LRA field of the SRR entry in FIG. 6A are the same as those shown in FIG. 5A, their description will be omitted.

The related art disc such as DVD requires additional areas (for example, boarder-in/boarder-out) in order to distinguish the session, but the additional area causes the entire recording capacity of the disc to be reduced. Therefore, the present invention advantageously provides information identifying the start of the session in order to allow the session structure of the entire disc to be easily checked using only a session flag without the allocation of the additional area.

Accordingly, the status field 31 of the SRR entry 35 as shown in FIG. 6A includes one bit (31a) carrying a P-flag for identifying whether or not the padding is performed in the corresponding SRR, and another bit (31c) used as a session flag (hereinafter, referred to as an "S-flag") for identifying whether or not the corresponding SRR is a session start SRR (start of a session). The remaining 2 bits (31d) of the status field 31 remain as a reserved area for coping with future modifications in the standard as needed.

As in the example of FIG. 5A, if the P-flag in FIG. 6A has a value of "1b", it means that the corresponding SRR is a closed SRR in which the padding has been performed. If the P-flag has a value of "0b", it means that the corresponding SRR is an SRR in which no padding has been performed. Accordingly, if the P-flag has the value of "0b", the corresponding SRR can be an opened SRR or a closed SRR. However, if the corresponding SRR is an SRR that is registered in the "List of opened SRRs" field 52 within the SRRI header 50, it means the corresponding SRR is an opened SRR; however, if it is not registered, it means the corresponding SRR is a closed SRR.

Further, in the example of FIG. 6A, if the S-flag has a value of "1b", it means that the corresponding SRR is the session start SRR. If the S-flag has a value of "0b", it means that the corresponding SRR is not the session start SRR. Other values may be used for the S-flag and/or P-flag.

Figure 6C:
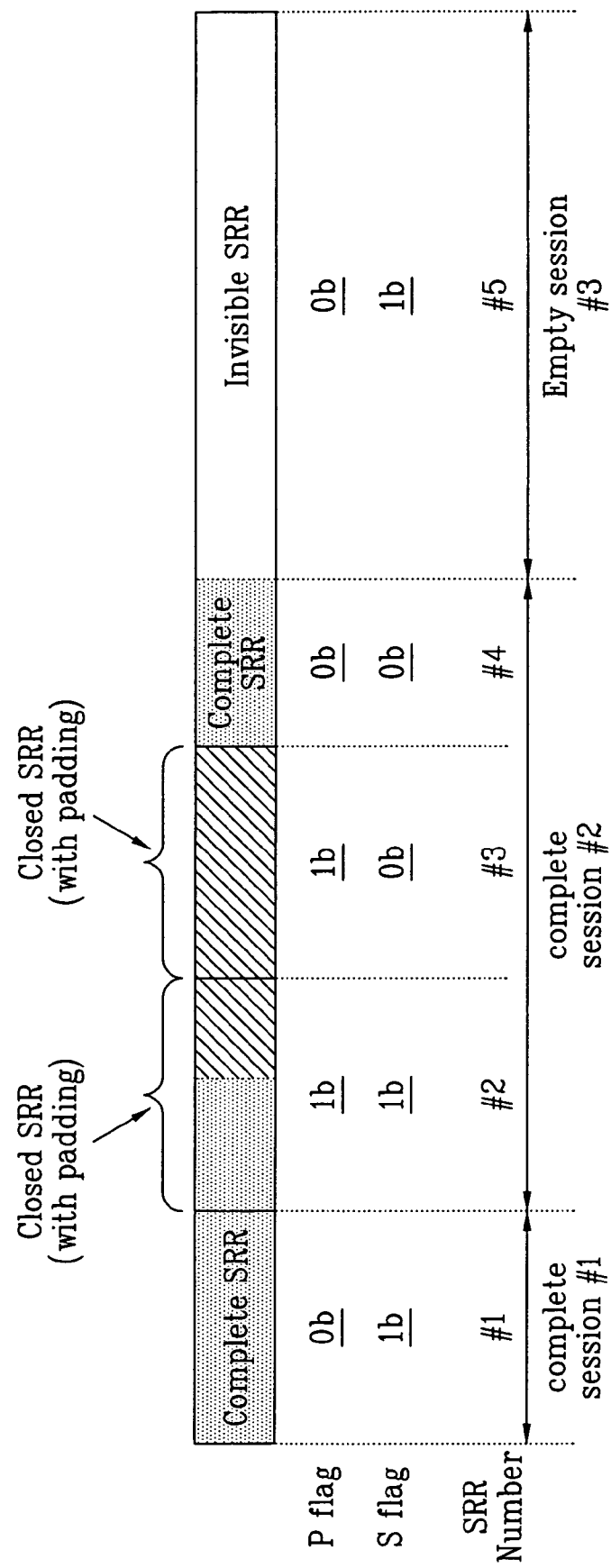

FIGS. 6B and 6C illustrate two examples of recording the P-flag and the S-flag of FIG. 6A based on the method of creating the SRR entry according to the second embodiment of the present invention. For the convenience of explanation, FIG. 6B illustrates the case of FIG. 4F in which no padding has been performed in the closing of the SRR(s), and FIG. 6C illustrates the case of FIG. 4G in which padding has been performed in the closing of the SRR(s).

Referring to FIG. 6B, in the example, SRR numbers #1 to #5 are assigned to five SRRs in sequence, respectively, and the sessions include two complete sessions #1 and #2 and one empty session #3.

The SRR #2 in FIG. 6B is a closed partially recorded SRR without padding, which is indicated in the corresponding SRR entry (SRR #2 entry) by the P-flag of "0b". The S-flag in the SRR #2 entry has a value of "1b" because the SRR #2 is the session start SRR, i.e., the start SRR of the session #2.

The SRR #3 in FIG. 6B is a closed empty SRR without padding, which is indicated in the SRR #3 entry by the P-flag of "0b". The S-flag in the SRR #3 entry has a value of "0b" because the SRR #3 is not the start SRR of the session #2.

The SRR #4 in FIG. 6B is a complete SRR without padding, which is indicated in the SRR #4 entry by the P-flag of "0b". The S-flag in the SRR #4 entry has a value of "0b" because the SRR #4 is not the start SRR of the session #2.

The SRR #5 in FIG. 6B is an invisible SRR without padding, which is indicated in the SRR #5 entry by the P-flag of "0b". The S-flag in the SRR #5 entry has a value of "1b" because the SRR #5 is the start/end SRR of the session #3.

In the case of FIG. 6B, all SRRs have no padding as indicated by the P-flags of "0b". In case of the session start SRRs #1, #2 and #5, their S-flags have a value of "1b". The opened SRR is the SRR #5 (invisible SRR). Therefore, only the SRR #5 is recorded in the "List of opened SRRs" field 52 within the SRRI header 50 as "1st opened SRR".

Referring to FIG. 6C, in the example, SRR numbers #1 to #5 are assigned to five SRRs in sequence, respectively and the sessions include two complete sessions #1 and #2 and one empty session #3.

The SRR #2 in FIG. 6C is a closed SRR #2 with padding, which is indicated in the corresponding SRR entry (SRR #2 entry) by the P-flag of "1b". The S-flag in the SRR #2 entry has a value of "1b" because the SRR #2 is the session start SRR, i.e., the start SRR of the session #2.

The SRR #3 in FIG. 6C is a closed empty SRR with padding, which is indicated in the SRR #3 entry by the P-flag of "1b". The S-flag in the SRR #3 entry has a value of "0b" because the SRR #3 is not the start SRR of the session #2.

The SRR #4 in FIG. 6C is a complete SRR without padding, which is indicated in the SRR #4 entry by the P-flag of "0b". The S-flag in the SRR #4 entry has a value of "0b" because the SRR #4 is not the start SRR of the session #2.

The SRR #5 in FIG. 6C is an invisible SRR without padding, which is indicated in the SRR #5 entry by the P-flag of "0b". The S-flag in the SRR #5 entry has a value of "1b" because the SRR #5 is the start SRR of the session #3.

In the case of FIG. 6C, three SRRs #1, #4 and #5 have no padding as indicated by their P-flags of "0b". Two SRRs #2 and #3 have the padding as indicated by their P-flags of "1b". In the session start SRRs #2 and #3, their S-flags are recorded with "1b". Also, similar to the case of FIG. 6B, the opened SRR is only the SRR #5 (invisible SRR). Therefore, only the SRR #5 is recorded in the "List of opened SRRs" field 52 of the SRRI header 50 as "1st opened SRR".

Accordingly, by defining both the "P-flag" and "S-flag" within the SRR status information as in the second embodiment, the closed SRRs can be distinguished using the padding. Different types of sessions can be distinguished without having to allocate additional areas to the start and end of the session, thus improving the efficiency of the optical recording/playback operations significantly.

A method of recording and updating the SRRI that indicates the recorded status of the disc according to the present invention will be now described. Specifically, specific data are padded in closing the SRR(s) and the lost SRRI can be effectively recovered using the padded SRR(s).

FIG. 7A illustrates an initial blank disc that is in a recordable status all over the entire area. A start location of the disc becomes the NWA. In such a state, only one SRR is present at the disc. This is the same as the invisible SRR shown in FIG. 2A. Therefore, the session is in the disc initial status in which only one empty session is present. This is the case of the blank disc in which the SRRI is not yet recorded.

Figure 7B:
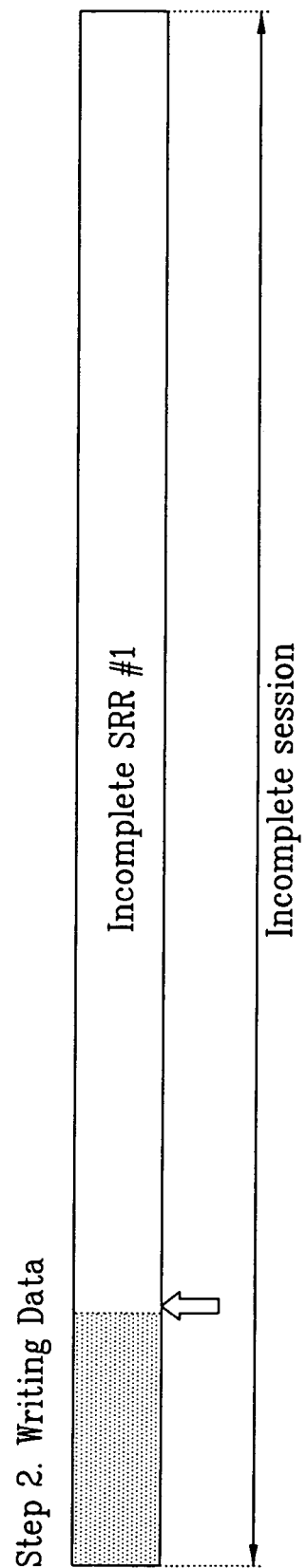
FIGS. 7A to 11B illustrate examples of recording SRRI depending on a disc recording state in the write-once optical disc of FIG. 1 according to the present invention.

FIG. 7B illustrate a case that some portion of the blank disc of FIG. 7A is recorded with data, but the session is not closed. In such a state, only one SRR (SRR #1) is present at the disc. This is the same as the incomplete SRR shown in FIG. 2B. Therefore, the disc is in such a status that only one incomplete session is present.

FIG. 7C illustrates a process of recording an SRRI in the management area of the disc when the disc is in the state of FIG. 7B. For the convenience of explanation, only certain portions among all the different components of the disc structure and SRRI structure shown in FIG. 1 are shown. For instance, although the (SRRI+TDDS) or (TDFL+TDDS) are recorded in each cluster of the TDMA such as the TDMA0 of the disc as discussed above, only the SRRI is shown in the TDMA0 of FIG. 7C, and the TDFL and/or TDDS is omitted for the sake of clarity. Further, only the "List of opened SRRs" field 52 and the "List of SRR entries" field 30 among the different fields of the SRRI shown in FIG. 1 are shown.

The disc recorded status of FIG. 7C is the case where only one opened SRR (SRR #1) is present in all the disc area as in FIG. 7B. As shown in FIG. 7C, when the incomplete SRR #1 is formed without closing the session as in FIG. 7B, the SRRI #1 (60a) pertaining to the SRR #1 is generated and recorded in the TDMA0. In the SRRI #1 (60a), the SRR number of the opened SRR #1 is recorded in its "List of opened SRRs" field 52a. In the "List of SRR entries" field 30a of the SRRI #1 (60a), only one SRR entry 35a pertaining to the SRR #1 is present. The SRR entry 35a (or SRR entries 35b-35p discussed later) can have the SRR entry structure of FIG. 5A or 6A discussed above.

FIG. 7D illustrates a detailed structure of the "List of opened SRRs" field, which is recorded in the SRRI header, according to an embodiment of the present invention. The structure of this field as shown in FIG. 7D is applicable to any "List of opened SRRs" field of the present invention, such as the fields 52 and 52a-52f (discussed later). The information stored in this field is used to identify the location of any opened SRR(s). The usage of this field is described as follows in more detail.

The opened SRR entry number is recorded, as the information on the location of the opened SRR entry, in the "List of opened SRRs" field of the SRRI. That is, the location of the opened SRR entry is identified using the "opened SRR number" wherein the total number of opened SRRs that is allowed at a given time is maximum sixteen, in this example. Two bytes are allotted to store each of the sixteen different opened SRR numbers.

To carry out an operation on a disc, the recording/playback apparatus must determine the recordable location(s) of the disc when the optical disc is loaded. This is possible by obtaining the NWA value from any opened SRR. Accordingly, the recording/playback apparatus needs to know the location of any opened SRR on the disc to be able to determine the recordable location(s) on the disc. However, since there is no information that identifies directly whether a particular SRR is an opened SRR or a closed SRR, the present invention provides the "List of opened SRRs" field at the header of an SRRI and accesses this field to obtain the location of any opened SRR by the SRR numbers. Once the opened SRR number is identified, the corresponding SRR number entry can be accessed from the SRRI to obtain the exact location (i.e., by accessing the start address in the start address field of the SRR entry) of the opened SRR. In this manner, the optical recording/playback apparatus can read out the opened SRR entry information more easily.

According to the present invention, only the SRR whose SRR number is recorded in the "List of opened SRRs" field of the SRRI is considered to be an opened SRR. If the opened SRR is changed to a closed SRR, the SRR number of the changed SRR is erased or removed from "List of opened SRRs" field. Applied differently, to close a particular opened SRR, e.g., in response to a close command, the SRR of that SRR is removed from the "List of opened SRRs" field of the SRRI. Removal of the SRR number from the "List of opened SRRs" field then indicates the closing of the corresponding SRR.

Figure 8A:
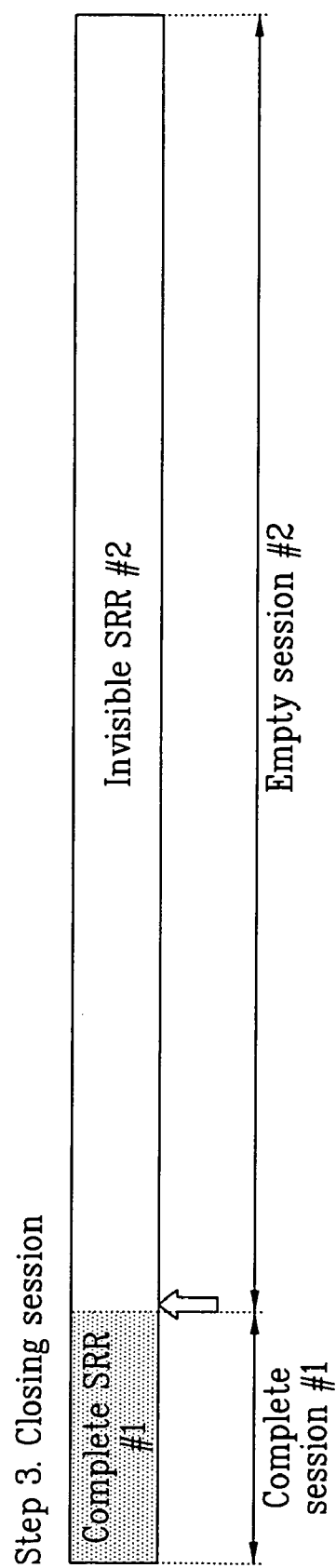

FIG. 8A illustrates a case when a session close command is executed when the disc is in the state of FIG. 7B. As shown in FIG. 8A, the existing data recorded area is separated into an independent closed SRR by the session close command and a new session is generated. In other words, the complete recorded area in FIG. 7B becomes a complete SRR #1, which in turn constitutes a complete session #1. The non-recorded area then becomes an invisible SRR #2, which in turn constitutes an empty session #2.

FIG. 8B illustrates a process of recording the disc recorded status as it pertains to the disc state as of FIG. 8A. As shown in FIG. 8B, an SRRI #2 (60b) is recorded in the TDMA0, next to the previously recorded SRRI #1 (60a). Since the disc recorded status of FIG. 8A is the case where only one opened SRR (SRR #2) and one closed SRR (SRR #1) are present on the entire disc area, the corresponding opened SRR number (SRR #2) is recorded in the "List of opened SRRs" field 52b of the SRRI #2 (60b). Further, information on the two SRR entries (SRR #1 and SRR #2) is recorded in the "List of SRR entries" field 30b of the SRRI #2 (60b) as SRR entries 35b and 35c.

In FIG. 8B, a closed SRR entry has been indicated using a shaded mark. Although not shown, it should understood that along with the recording of the SRRI #2 (60b) in the TDMA0, other management information such as the updated TDDS information is also recorded in the corresponding cluster (or recording-unit) of the TDMA0.

FIG. 9A illustrates a case when two opened SRRs are reserved for a new recording from the disc state of FIG. 8A. As shown in FIG. 9A, the newly reserved opened SRRs become an opened empty SRR #2 and an opened empty SRR #3 each having an appropriate NWA as indicated by the thick arrows. The remaining area becomes an invisible (opened) SRR #4. The sessions include the complete session #1 and the session #2 which has been changed from the empty session to the incomplete session.

Figure 9B:
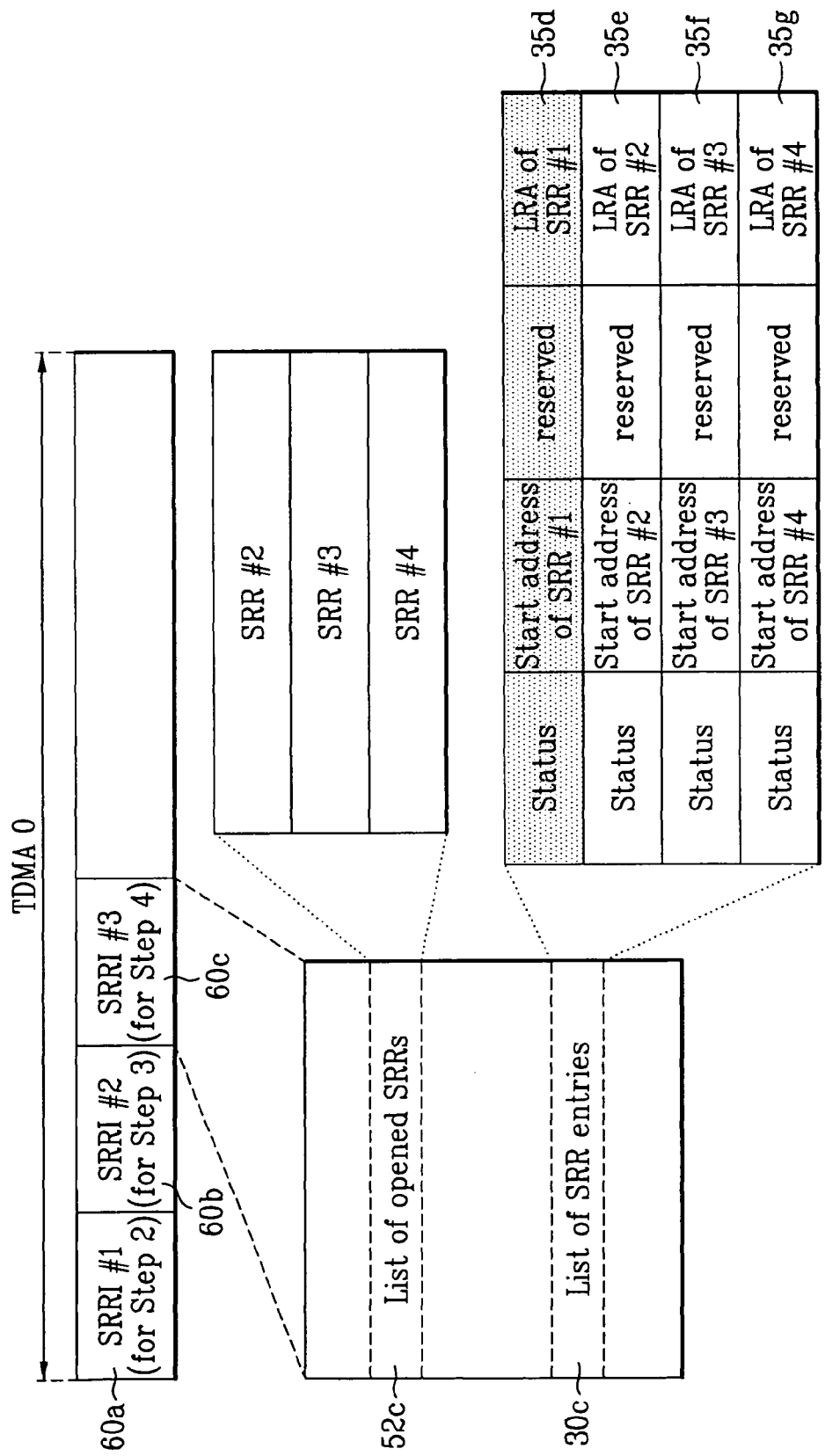

FIG. 9B illustrates a process of recording the disc recorded status as it pertains to the disc state as of FIG. 9A. As shown in FIG. 9B, another SRRI #3 (60c) is recorded in the TDMA0, next to the previously recorded SRRI #2 (60b). Since the disc recorded status of FIG. 9A is the case where three opened SRRs (SRRs #2, #3, #4) and one closed SRR (SRR #1) are present, the corresponding opened SRR numbers (SRRs #2, #3, #4) are recorded in the "List of opened SRRs" field 52c of the SRRI #3 (60c). Further, information on all four SRR entries (SRRs #1-#4) is recorded in the "List of SRR entries" field 30c of the SRRI #3 (60c) as SRR entries 35d-35g, respectively.

In FIG. 9B, a closed SRR entry has been indicated using a shaded mark. Although not shown, it should understood that along with the recording of the SRRI #3 (60c) in the TDMA0, other management information such as the updated TDDS information is also recorded in the corresponding cluster (or recording unit) of the TDMA0.

Figure 10A:
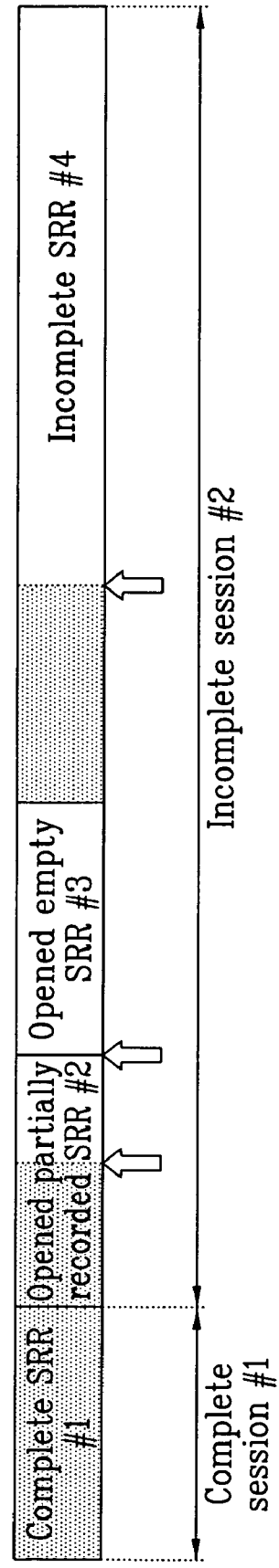

FIG. 10A illustrates a case when data are recorded to the first empty SRR (SRR #2) and to the invisible SRR (SRR #4) in the disc state of FIG. 9A. As a result, the first empty SRR is changed to the opened partially recorded SRR #2, the invisible SRR is changed to the incomplete SRR #4, but the opened empty SRR #3 is not changed.

Figure 10B:
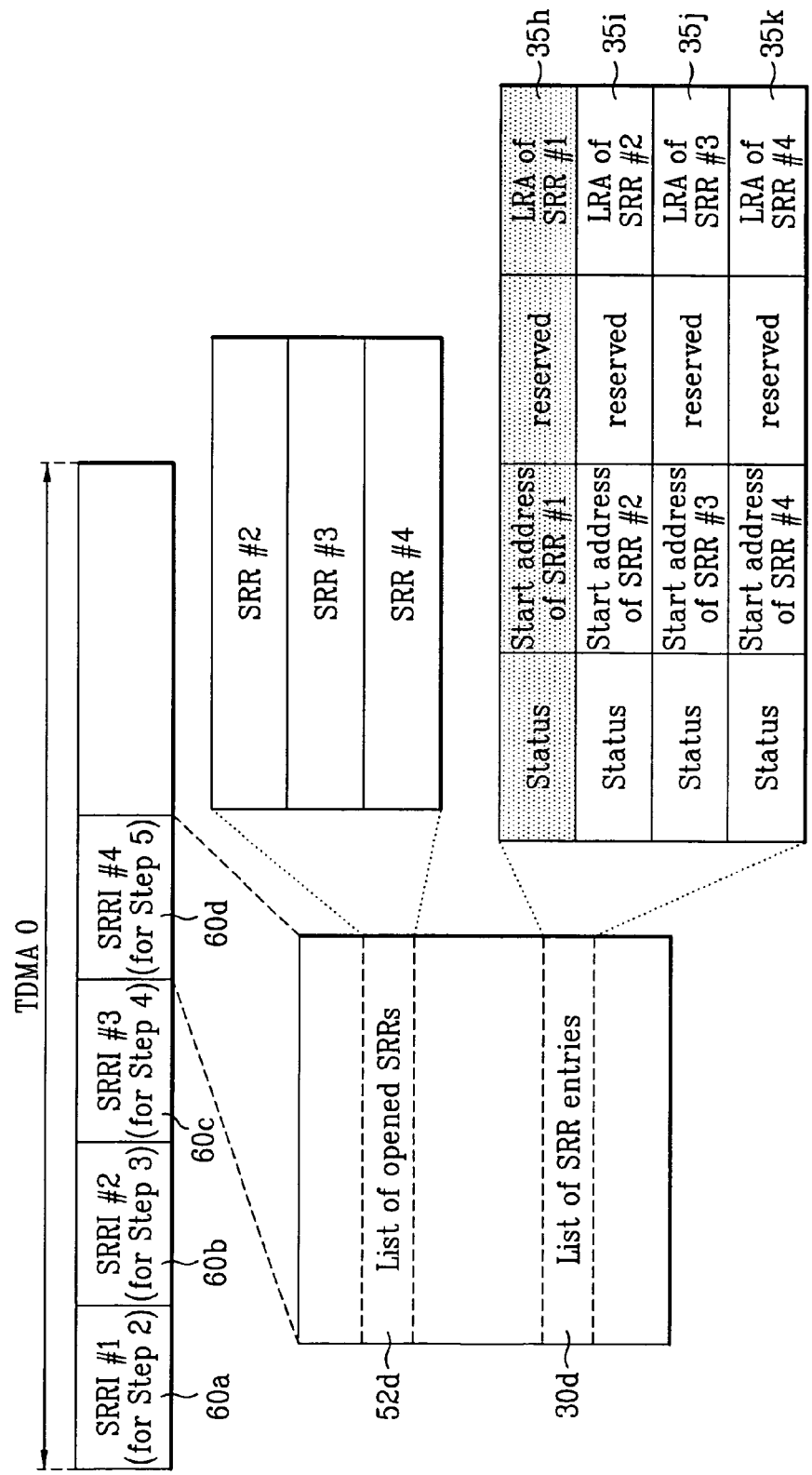

FIG. 10B illustrates a process of recording the disc recorded status as it pertains to the disc state as of FIG. 10A. As shown in FIG. 10B, another SRRI #4 (60d) is recorded in the TDMA0, next to the previously recorded SRRI #3 (60c). Since the disc recorded status of FIG. 10A is the case where three opened SRRs (SRRs #2, #3, #4) and one closed SRR (SRR #1) are present, the corresponding opened SRR numbers (SRRs #2, #3, #4) are recorded in the "List of opened SRRs" field 52d of the SRRI #4 (60d). Further, information on all four SRR entries (SRRs #1-#4) is recorded in the "List of SRR entries" field 30d of the SRRI #4 (60d) as SRR entries 35h-35k, respectively.

In FIG. 10B, a closed SRR entry has been indicated using a shaded mark. Although not shown, it should understood that along with the recording of the SRRI #4 (60d) in the TDMA0, other management information such as the updated TDDS information is also recorded in the corresponding cluster (or recording unit) of the TDMA0.

The number of SRR entries and the location of the opened SRRs in FIG. 10B are equal to the case of FIG. 9B. However, since recording in the specific opened SRR has been performed as shown in FIG. 10A, the LRA information within the opened SRR entry in which such recording is performed is changed. Therefore, the additionally recordable NWA location is also changed.

Figure 11A:
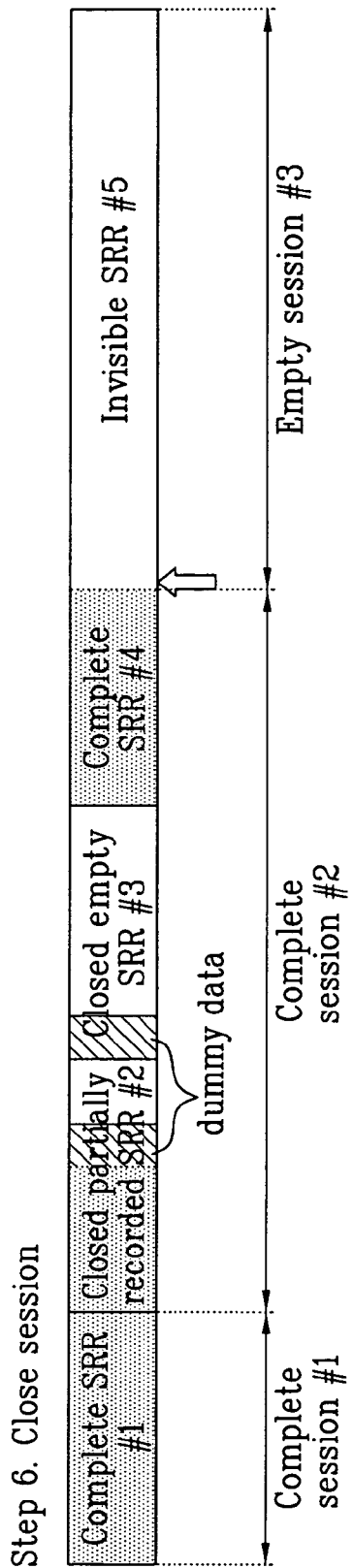

FIG. 11A illustrates a case when a session close command is executed in the disc state of FIG. 10A, but its opened SRR is closed after some additionally recordable area of the opened SRR is padded. In the padding operation, the entire or some part of the additionally recordable area of the opened SRR may be selectively padded as discussed above. The padding is performed using dummy data (e.g., zero) or specific real data (e.g., character code "CLSD") as padding data as discussed above. That is, the padding operation in FIG. 11A is the same as that discussed in connection with FIGS. 3D and 3E.

As shown in FIG. 11A, the existing data recorded area becomes an independent complete session by the session close command and all SRRs contained in that complete session are changed to closed SRRs. For instance, in response to the session close command, a part (e.g., a first cluster after the LRA) of each opened SRR is padded and the SRRs are closed. In this case, the LRA information recorded in the SRR entry means the last recorded area on which the actual user data are recorded, and the dummy data portion does not influence the determination of the LRA location. After the close command has been executed, this results in a closed partially recorded SRR #2, a closed empty SRR #3 and the complete SRR #4, which in turn constitute a newly reserved complete session #2. The remaining outermost SRR becomes an invisible (opened) SRR #5, which in turn constitutes an empty session #3.

Figure 11B:
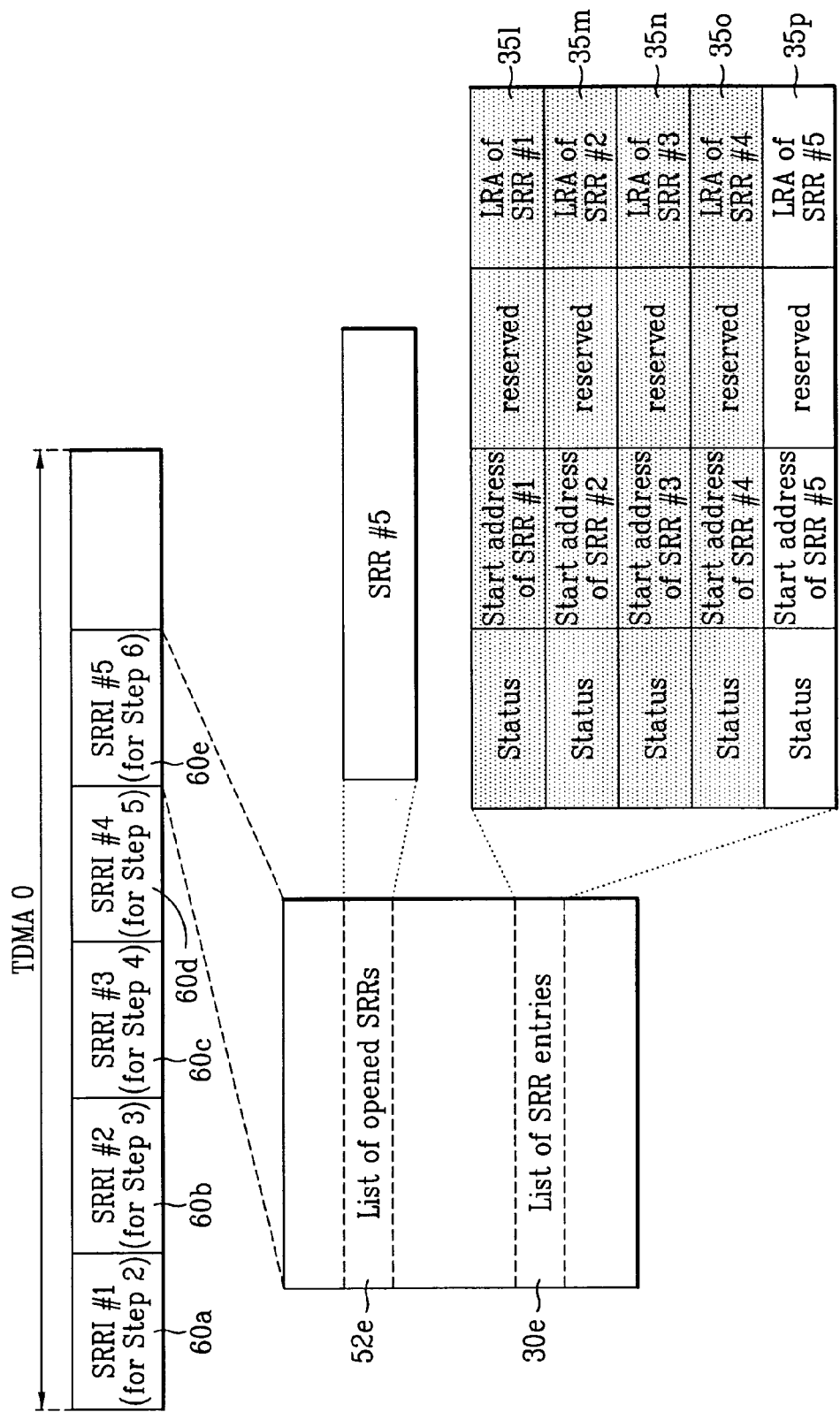

FIG. 11B illustrates a process of recording the disc recorded status as it pertains to the disc state as of FIG. 11A. As shown in FIG. 11B, another SRRI #5 (60e) is recorded in the TDMA0, next to the previously recorded SRRI #4 (60d). Since the disc recorded status of FIG. 11A is the case where only one opened SRR (SRR #5) and four closed SRRs (SRRs #1-#4) are present, the corresponding opened SRR number (SRR #5) is recorded in the "List of opened SRRs" field 52e of the SRRI #5 (60e). Further, information on all five SRR entries (SRRs #1-#5) is recorded in the "List of SRR entries" field 30e of the SRRI #5 (60e) as SRR entries 351-35p, respectively.

In FIG. 11B, a closed SRR entry has been indicated using a shaded mark. Although not shown, it should understood that along with the recording of the SRRI #5 (60e) in the TDMA0, other management information such as the updated TDDS information is also recorded in the corresponding cluster (or recording unit) of the TDMA0.

In the case of the SRR #2 and SRR #3 in which the dummy data are padded by the close command, the last location in which the actual user data are recorded is recorded in the LRA field of the corresponding SRR entry.

Also, if the P-flag is present in the status field of the SRR entry as discussed above, it is possible to recognize that the corresponding closed SRR is closed by the padding. If the P-flag is not present in the SRR entry, it can be determined that the corresponding SRR is a padded SRR by examining the recorded status of the SRR area after its LRA, i.e., by checking to see the presence or absence of specific padding data at the NWA (after LRA) of the SRR.

As can be seen through FIGS. 7A to 11B, SRRI is the information indicating the recorded status of the current disc. The recording/playback apparatus must check the latest SRRI (SRRI #5, in the above example) finally recorded in the management area, when the corresponding disc is loaded. Since only the latest SRRI correctly indicates the final recorded status of the disc, it is possible to check the location of the additionally recorded SRR.

However, when the power is suddenly turned off while using the disc or the disc is damaged, the latest SRRI of the disc may be not read out correctly. At this time, the final recorded status need to be reconstructed using the latest SRRI among the non-damaged SRRIs. According to the present invention, the SRR is padded in the padding operation when the SRR is to be closed, and this padding information can be used to reconstruct the final recorded status of the disc even when the latest SRRI on the disc is at a damaged condition. Through it, it is possible to recover the latest SRRI and the current recorded status of the disc.

Figure 12:
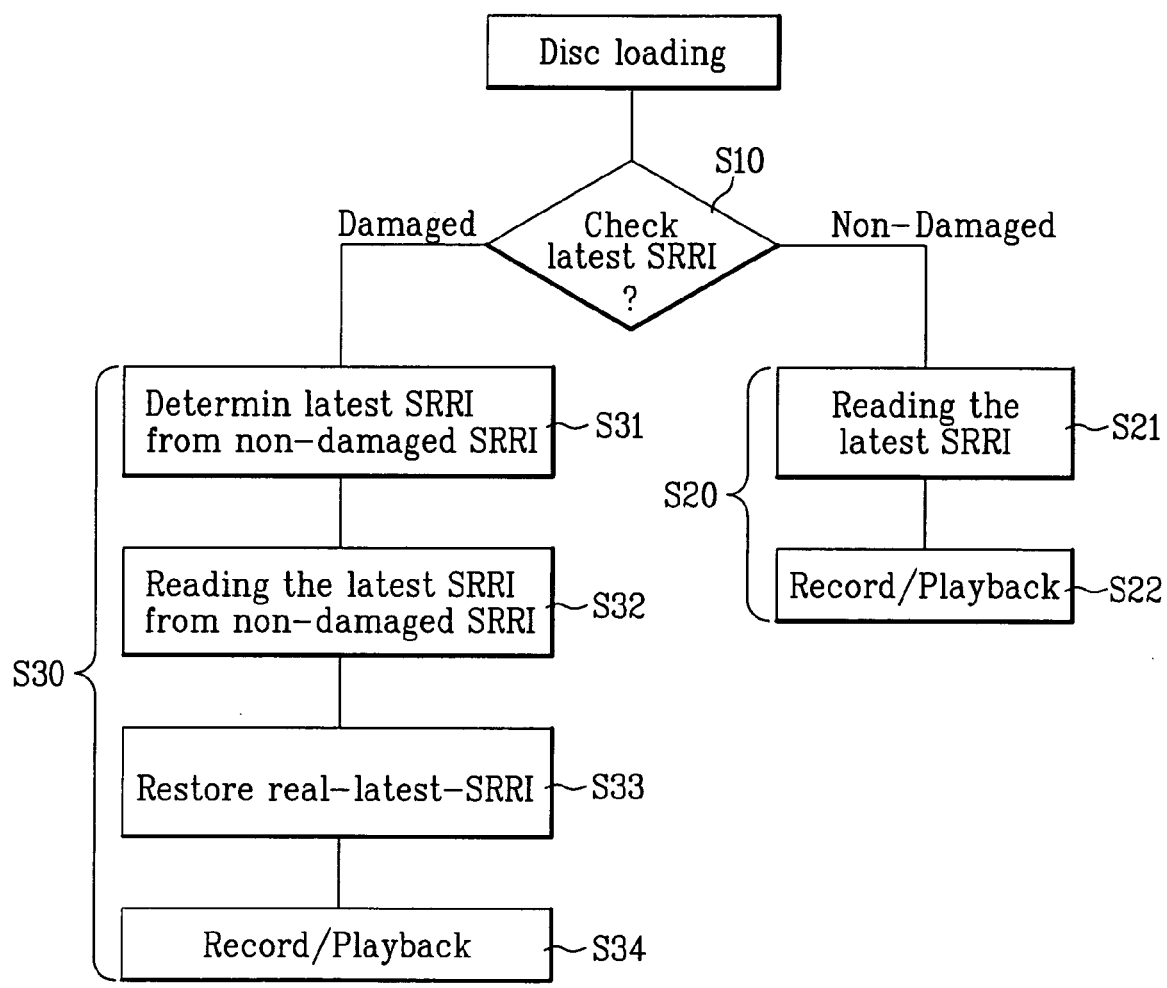
FIG. 12 is a flowchart illustrating a method of using SRRIs of a write-once optical disc when the latest SRRI is damaged according to an embodiment of the present invention.
Figure 13A:
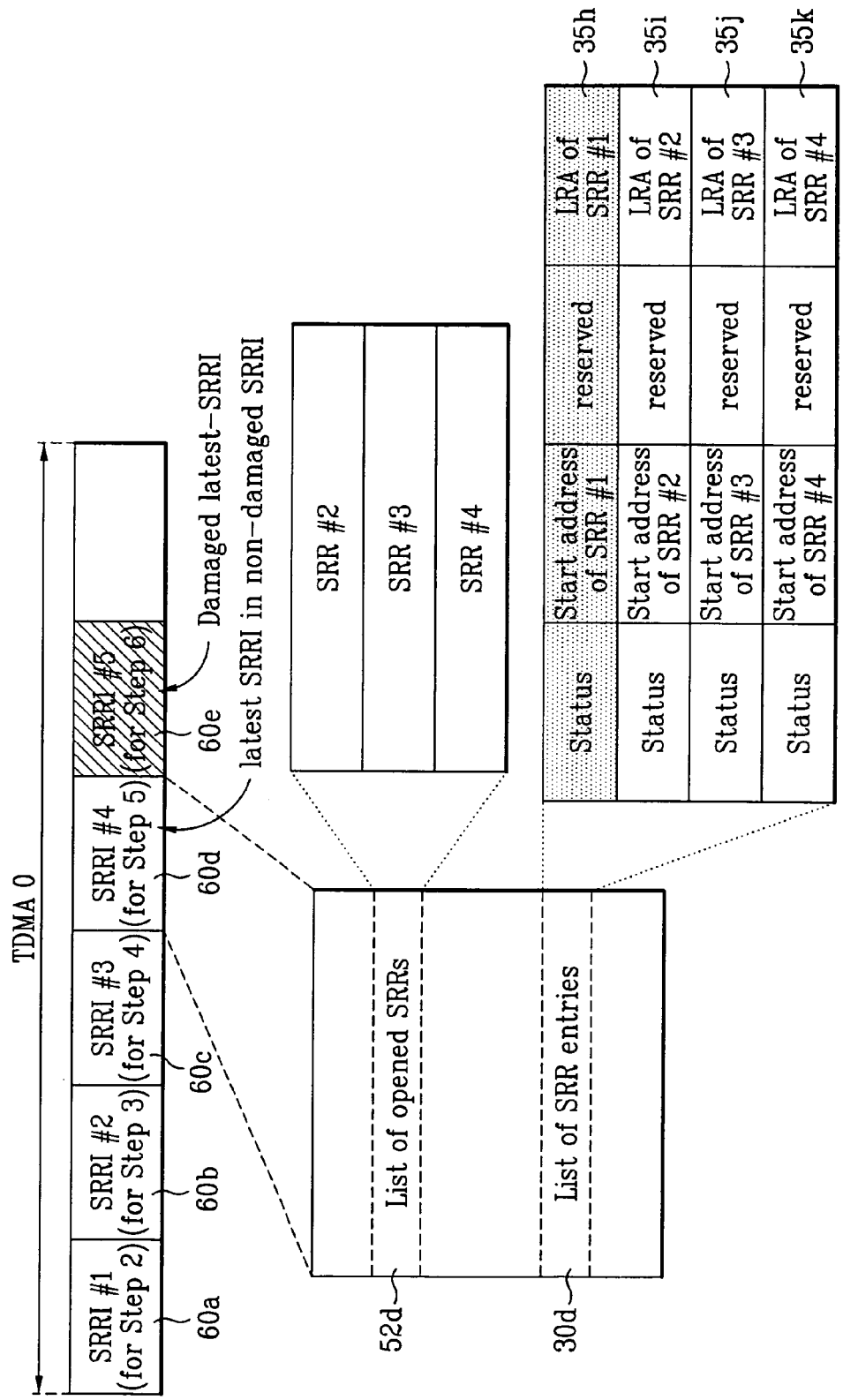
FIGS. 13A and 13B illustrate a method of restoring the latest SRRI in the write-once optical disc according to an embodiment of the present invention.
Figure 13B:
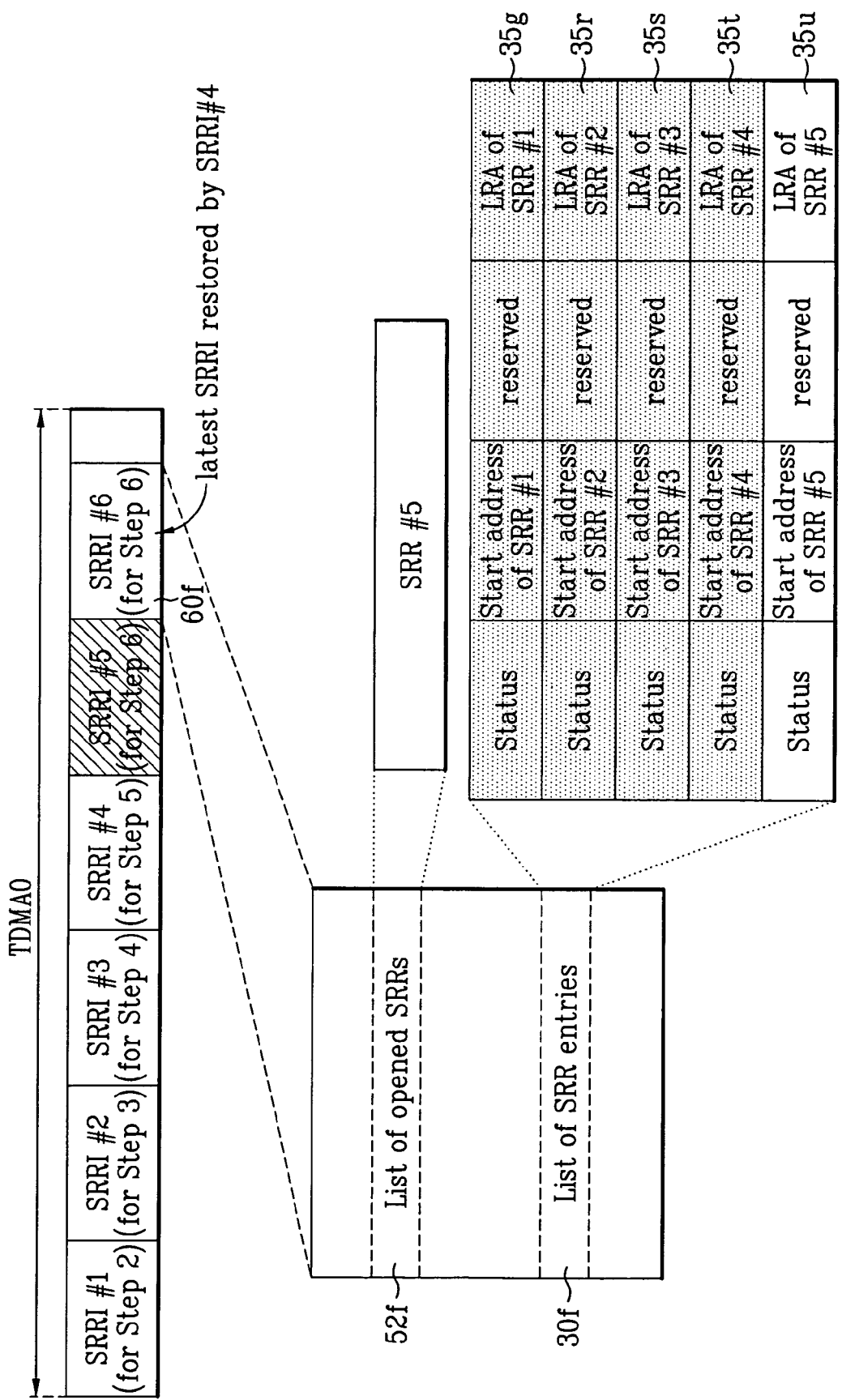

FIGS. 12, 13A and 13B illustrate a recording method of a write-once optical disc according to the present invention. This method recovers the latest SRRI of the disc, even when the latest SRRI is damaged, and the recording/playing back can be performed using the finally recorded status obtained from the latest SRRI.

When the corresponding SRRI is judged as a defective area and the recorded information is not reliable, the SRRI is said to be damaged. If the latest SRRI is damaged, it means that the finally recorded status of the disc cannot be obtained from the latest SRRI. Therefore, the recordable location of the disc cannot be known. In the worst case, the disc itself cannot be used any more.

The present invention provides the method of correctly recovering the finally recorded status of the disc when the latest SRRI is damaged. Particularly, FIG. 12 is a flowchart illustrating a method of recovering the finally recorded status of a write-once optical disc such as a BD-WO and performing the recording/playback operation on the disc according to an embodiment of the present invention. The disc contains the disc structure and the SRRI structure as discussed above.

Figure 14:
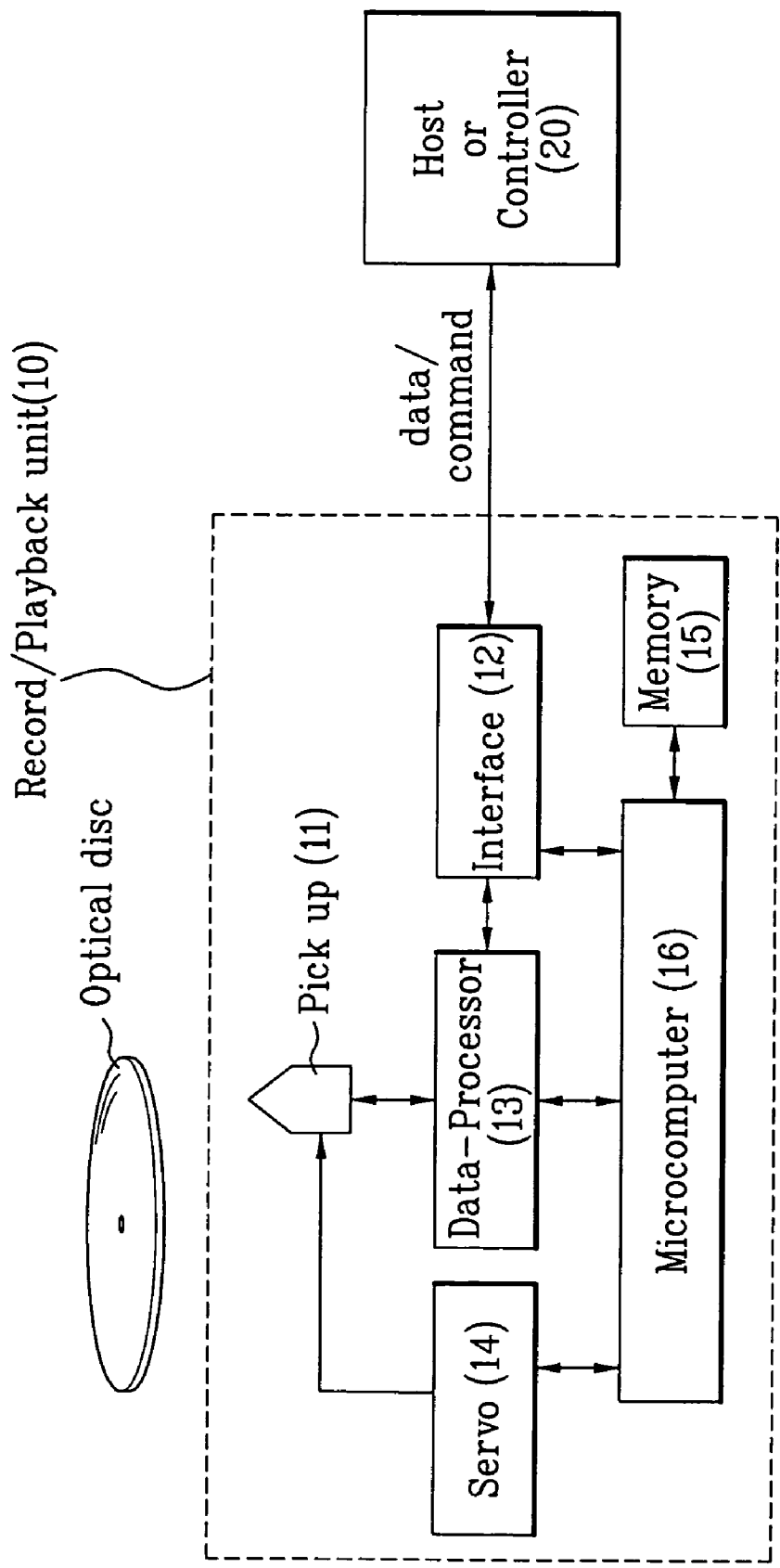
FIG. 14 illustrates a recording/playback apparatus for a write-once optical disc according to an embodiment of the present invention.

Referring to FIG. 12, if the disc is loaded in an optical recording/playback apparatus such one shown in FIG. 14, the latest SRRI recorded within the management area (e.g., the TDMA0) is read out. Then, it is checked whether or not the read SRRI is damaged (S10).

If the latest SRRI is not damaged, the final disc recorded status is obtained from the latest SRRI (S21). Then using the latest SRRI, the recording is performed to only the additionally recordable area and/or the playback operation is performed to the already recorded area (S22). The information on such areas is obtained from the latest SRRI.

On the other hand, if the step S10 determines that the latest SRRI is damaged, the latest SRRI among the non-damaged SRRI(s) is determined (S31). Then this latest non-damaged SRRI is read out (S32). The damaged SRRI can be recovered using the latest non-damaged SRRI and the actual recorded status of the disc (S33). Step S33 may be an optional step. The recording is performed to the additionally recorded area and/or the playback operation is performed to the already recorded area (S34). Information on such areas can be determined from the latest non-damaged SRRI and/or the actual recorded status of the disc. After the recording/playback step S34, the newly changed recorded status may be recorded as a new SRRI in the management area.

FIGS. 13A and 13B illustrates an example of the step S33 in FIG. 12 of recovering the finally recorded status when the latest SRRI (SRRI #5 in the example of FIG. 11B) is damaged. For the convenience of explanation, the SRRI recording method of FIGS. 7A to 11B will be described as an example.

As shown in FIG. 13A, if the SRRIs are in the normal status, the SRRI #5 (60e) becomes the latest SRRI of the disc. However, if the SRRI #5 is damaged, the recording/playback apparatus reads the latest SRRI among the non-damaged SRRIs. In the example, the SRRI #4 (60d) is the latest SRRI among the non-damaged SRRIs #1-#4.

The actual recorded status associated with step 6 in FIG. 11A can be determined from the SRRI #5 (60e) which is written as indicated in FIG. 11B. However, since the SRRI #5 (60e) is damaged, the latest SRR information that can be checked by the recording/playback apparatus is the SRRI #4 (60d). But the SRRI #4 does not necessarily carry the finally recorded status of the disc since the SRRI #5 carries this information. Then, in order to recover the finally recorded status of the disc without using the SRRI #5, the SRRI #4 and the actual finally recorded status of the disc need to be compared. This can be accomplished as follows.

The recording/playback apparatus checks the location of the opened SRR(s) and the associated LRA information from the SRRI #4. In the example of FIG. 13A, it is determined from the "List of opened SRRs" field 52d of the SRRI #4 (60d) that there are three opened SRRs #2, #3 and #4. Then by accessing the LRA field of these SRR entries corresponding to these opened SRRs from the "List of SRR entries" field 30d of the SRRI #4 (60d), the LRAs are obtained and used to verify whether the corresponding SRR is truly an opened SRR. In this regard, only the opened SRR(s) identified in the field 52d of the SRRI #4 (60d) are examined. The location recorded with the closed SRR(s) may not be verified. Once an opened SRR is changed to a closed SRR, the closed SRR cannot be changed back to an opened SRR. As a result, the recovery of the final SRR information is possible by checking whether each of the opened SRR(s) is changed to the closed SRR.

In the case of the SRRs #2 and #3 that are identified as the opened SRRs in the field 52d of the SRRI #4 (60d), each of the SRRs #2 and #3 is examined to determine whether or not predetermined padding data (e.g., dummy data) are recorded after its LRA (identified in the LRA field of the entry), as can be seen from FIG. 11A (actual final disc recorded status). If the padding is detected, then the recording/playback apparatus determines that the corresponding opened SRR is changed to a closed SRR.

In the case of the SRR #4 that is recognized as the opened SRR from the field 52d of the SRRI #4, the recording/playback apparatus examines the SRR #4 to determine whether or not the padding data (e.g., dummy data) are presented after its LRA location in FIG. 11A (actual final disc recorded status). The SRR #4 can be analyzed as the opened SRR in the actual final disc recorded status. Also, it can be seen that an area after the LRA location of the SRR #4 is recordable, i.e., this area is the NWA. Then in the recording/playback apparatus, the already recorded area of the original SRR #4 is determined to a closed SRR (new closed SRR #4) and only the recordable area of the original SRR #4 is analyzed as the opened SRR (new SRR #5). Thus the contents of the damaged SRRI #5 can be reconstructed by using the above analysis results. Moreover, since the information necessary to perform the recording operation by the recording/playback apparatus is the additionally recordable position information (NWA), the NWA location in association with the old and new SRR #4 is not changed and thus can be used by the recording/playback apparatus.

FIG. 13B illustrates a result of the recovery of the latest SRRI #5 by the process of FIG. 13A as discussed above. This result accords with the final recorded status of the actual disc. Accordingly, the recording/playback apparatus again records the selectively recovered latest SRRI #5 within the management area (at this time, as the SRRI #6 (60f), or performs the recording to only the additionally recordable area. The SRRI #6 (60f) includes the "List of opened SRRs" field 52f identifying the SRR #5, and the "List of SRR entries" field 30f containing SRR entries 35q-35u corresponding respectively to the SRRs #1-#5. Also, even if the recovered SRRI #5 is not recorded as the SRRI #6, data recording is performed from the recovered NWA information and the recorded status as changed by the data recording to the recovered NWA is recorded as a new SRRI #6.

FIG. 14 illustrates an optical disc recording/playback apparatus according to the present invention. This apparatus or other suitable apparatus or system can be used to implement the disc and/or SRRI structures and methods of the present invention discussed herein.

Referring to FIG. 14, the optical disc recording/playback apparatus includes a recording/playback unit 10 for recording and/or reproducing data to/from the optical disc and a controller 20 for controlling the recording/playback unit 10. All the elements of the recording/playback apparatus are operatively coupled. The controller 20 transmits a command for recording and/or reproducing to/from a special recording area such as an SRR/session on the disc, to the recording/playback unit 10. The recording/playback unit 10 records and/or reproduces data to/from the disc according to the commands of the controller 20.

The recording/playback unit 10 includes an interface unit 12, a pick-up unit 11, a data processor 13, a servo unit 14, a memory 15 and a microcomputer 16. The interface unit 12 communicates with external devices such as the controller 20. The pick-up unit 11 records or reproduces data to/from the optical disc directly. The data processor 13 receives a reproduction signal from the pick-up unit 11, restores a preferred signal, modulates a signal proper to the optical disc, and transmits the signal. The servo unit 14 controls the pick-up unit 11 to read the signal from the optical disc or to record the signal to the optical disc. The memory 15 stores temporarily data and various information including management information as discussed herein. The microcomputer 16 controls the components of the recording/playback unit 10. Since the recording/playback apparatus shown in FIG. 14 can selectively perform a padding operation, a designer can more freely design the recording/playback apparatus. The recording/playback unit 10 can automatically store specific data during a padding operation.

The recording/playback method of the optical disc according to the present invention may be divided into mainly two parts. First, as in the cases of FIGS. 4 to 6C, the padding is determined in the selective closed SRR and an information (e.g., P-flag) for identifying whether or not the padding is performed is recorded. Second, as in the cases of FIGS. 7A to 13B, the SRRI is effectively recovered by examining the SRR to determine if padding has been performed in the SRR. In other words, the presence or absence of the padding in the closed SRR is a selective matter. However, according to the present invention, the case of closing the SRR with padding may be more advantageous to data restoration.

The recording/playback method of the optical disc according to an embodiment of the present invention will be now described in detail. First, if the optical disc is loaded into the recording/playback apparatus, the SRRI recorded in a preset management area of the optical disc as the latest disc management information is read out together with the header and SRR entry(ies) of the SRRI, and the read out information is temporarily stored in the memory 15 of the recording/playback unit 10. Since the latest disc recorded status is recorded within the SRRI, the opened SRR is identifiable through the SRRI header information. The recorded or non-recorded status of the disc can be checked through the SRRI header information. Also, the presence or absence of the padding can be identifiable. This can be used in the recording/playback of the disc.

For instance, the microcomputer 16 can accurately check the SRR status existing within the disc from the SRRI, so that the recordable location (NWA) can be known from the checked opened SRR(s). Also, the presence or absence of the padding can be checked as discussed above. If the SRR is closed by the close command of the controller 20, the microcomputer 16 can select the closing with padding or the closing without padding. Also, it is possible to close the SRR without the padding in response to a specific command of the controller 20.

In case the SRR status is changed by the padding, the P-flag of the corresponding SRR entry is modified and recorded, such that other recording/playback apparatus can use this information. Such a function can be named "automatic padding function" of the recording/playback unit 10. This function is advantageous because it reduces the padding operation time. According to the present invention, the recording/playback apparatus with desired performance can be designed in various manners by defining the types, of SRRs and providing the methods of recording the SRRs and SRRIs.

Another recording/playback method according to the present invention will be described now. First, if the optical disc is loaded into the recording/playback apparatus, the controller 20 controls the pickup unit 11 to read out the latest SRRI recorded in the TDMA and determines whether the latest SRRI is damaged. If the latest SRRI is damaged, the latest SRRI is recovered from non-damaged SRRIs, as described in FIGS. 12, 13A and 13B. The latest SRRI can be recovered by checking the dummy data padded within the disc when the opened SRR is changed to the closed SRR.

If there is no damage in the latest SRRI, the recording/playback unit 10 performs the recording by checking the location of the additionally recordable opened SRR. Then, if the close command is received from the controller 20, the recording/playback unit 10 performs the padding to some or the entire area of additionally recordable areas remaining in the opened SRR, to close the SRR. Then, the changed recorded status of the disc is recorded in the latest SRRI within the management area. Even if any recording/playback apparatus again loads the corresponding optical disc and there is damage to the latest SRRI, the final recorded status of the disc can be checked.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of managing a recording medium, comprising the steps of:
    generating at least one currently open recording range in a first session on a data area of the recording medium, the first session comprising one or more recording ranges, each currently open recording range having a recordable location;
    recording management information onto at least one of first and second temporary management areas of the recording medium until the recording medium is finalized, the first temporary management area being allocated to a lead-in area by a predetermined size, the second temporary management area being allocated to a spare area by a non-predetermined size between 0 and a maximum size, the management information including one or more entries respectively corresponding to one or more recording ranges generated on the recording medium, each entry including a start address of a corresponding recording range and indication information for indicating whether the corresponding recording range is a start recording range of the first session, the management information also including a list of currently open recording ranges which has one or more identifications that identify each currently open recording range existing on the recording medium, a maximum number of the identifications included in the list of currently open recording ranges being limited to a predetermined number;
    closing the first session, including changing every currently open recording range contained in the first session to a closed recording range, while not closing an unrecorded area of a currently open recording range located last in the first session, wherein a size of the first session is changed when the first session is closed;
    after the first session is closed, creating a second session, wherein the unrecorded area of the currently open recording range located last in the first session becomes a start recording range of the second session for storing user data; and
    recording a new list of currently open recording ranges onto at least one of the first and second temporary management areas, the new list of currently open recording ranges not including an identification corresponding to a recording range included in the list of opened recording ranges of the first session and subsequently changed when closing the first session from an open recording range to a closed recording range, the new list of currently open recording ranges including the unrecorded area of the currently open recording range located last in the first session as the start recording range of the second session.

2. The method of claim 1, wherein the maximum number of the identifications is limited to 16.

3. The method of claim 1, wherein a recorded area of the open recording range which has a start address but of which end address is not defined becomes a closed recording range when closing the first session.

4. The method of claim 1, wherein the closed recording ranges are included in the first session.

5. The method of claim 1, further comprising:
    recording the management information in the temporary management area onto a plurality of management areas when the recording medium is to be finalized.

6. A recording medium, comprising:
    a data area configured to allocate a first session having at least one currently open recording range, the first session comprising one or more recording ranges, each currently open recording range having a recordable location; and
    first and second temporary management areas configured to store management information until the recording medium is finalized, the first temporary management area being allocated to a lead-in area by a predetermined size, the second temporary management area being allocated to a spare area by a non-predetermined size between 0 and a maximum size, the management information including a list of currently open recording ranges which has one or more entries respectively corresponding to one or more recording ranges allocated on the recording medium, each entry including a start address of a corresponding recording range and indication information for indicating whether the corresponding recording range is a start recording range of the first session, the management information also including one or more identifications that identify each currently open recording range existing on the recording medium, a maximum number of the identifications included in the list of currently open recording ranges being limited to a predetermined number, wherein, when closing the first session, every recording range contained in the first session is changed to a closed recording range, while not closing an unrecorded area of a currently open recording range located last in the first session, wherein a size of the first session is changed when the first session is closed, wherein the unrecorded area of the currently open recording range located last in the first session becomes a start recording range of a second session created after closing the first session for storing user data, and wherein at least one of the first and second temporary management areas stores therein a new list of currently open recording ranges, the new list of currently open recording ranges not including an identification corresponding to a recording range included in the list of opened recording ranges of the first session and subsequently changed when the first session from an open recording range to a closed recording range, the new list of currently open recording ranges including the unrecorded area of the currently open recording range located last in the first session as the start recording range of the second session.

7. The recording medium of claim 6, wherein the maximum number of the identifications is limited to 16.

8. The recording medium of claim 6, wherein the closed recording ranges are included in the first session.

9. An apparatus for managing a recording medium, comprising:

a pickup configured to read/record data from/to a first session of a data area of the recording medium, the first session comprising one or more recording ranges, wherein at least one of the one or more recording ranges in the first session is an currently open recording range having a recordable location, and the pickup further configured to read/record management information from/onto at least one of first and second temporary management areas of the recording medium until the recording medium is finalized, the first temporary management area being allocated to a lead-in area by a predetermined size, the second temporary management area being allocated to a spare area by a non-predetermined size between 0 and a maximum size, the management information including one or more entries respectively corresponding to one or more recording ranges generated on the recording medium, each entry including a start address of a corresponding recording range and indication information for indicating whether the corresponding recording range is a start recording range of the first session, the management information also including a list of currently open recording ranges which has one or more identifications that identify each currently open recording range existing on the recording medium, a maximum number of the identifications included in the list of currently open recording ranges being limited to a predetermined number;

a servo configured to control the pickup to read/record a signal from/onto the recording medium;

a data processor configured to process the signal read/recorded from/onto the recording medium; and a microcomputer operatively coupled to the components above—the pickup, the data processor and the servo, and configured to control the components so that the apparatus reproduces/records the management information from/onto at least one of the first and second temporary management areas of the recording medium, wherein the microcomputer is further configured to control the components so that when closing the first session the apparatus changes every currently open recording range contained in the first session to a closed recording range, while not closing an unrecorded area of a currently open recording range located in the first session, wherein a size of the first session is changed when the first session is closed, wherein the microcomputer is configured to control the components so that the apparatus creates a second session after the first session is closed, the second session including the unrecorded area of the currently open recording range located last in the first session as a start recording range of the second session for storing user data, and wherein the microcomputer is configured to control the components so that the apparatus records a new list of currently open recording ranges onto at least one of the first and second temporary management areas, the new list of currently open recording ranges excluding an identification corresponding to a recording range changed to be a closed recording range from the list of currently open recording ranges, the new list of currently open recording ranges including the unrecorded area of the currently open recording range located last in the first session as the start recording range of the second session.

10. The apparatus of claim 9, wherein the microcomputer is configured to control the components so that the apparatus reads or records the number of identifications from or onto the temporary management area, the number of identifications is limited to 16.

11. The apparatus of claim 9, wherein the microcomputer is configured to control the components so that the apparatus changes a recorded area of the open recording range which has a start address but of which end address is not defined into a closed recording range when closing the first session.

12. The apparatus of claim 9, wherein the closed recording ranges are included in the first session.

13. The apparatus of claim 9, wherein the microcomputer is configured to control the pickup to record the management information in the temporary management area onto a plurality of management areas when the recording medium is to be finalized.

14. A system for reproducing or recording data from or on a recording medium, comprising:

a recording/reproducing part including a microcomputer configured to generate at least one currently open recording range in a first session, the first session comprising one or more recording ranges, each currently open recording range having a recordable location, the recording/reproducing part including a pickup configured to read/record management information from/onto at least one of first and second temporary management areas of the recording medium until the recording medium is finalized, the first temporary management area being allocated to a lead-in area by a predetermined size, the second temporary management area being allocated to a spare area by a non-predetermined size between 0 and a maximum size, the management information including one or more entries respectively corresponding to one or more recording ranges generated on the recording medium, each entry including a start address of a corresponding recording range and indication information for indicating whether the corresponding recording range is a start recording range of the first session, the management information also including a list of currently open recording ranges containing each currently open recording range number, a maximum number of currently open recording ranges included in the list of currently open recording ranges being limited to a predetermined number, wherein the microcomputer is operatively coupled to the pickup and is configured to control the pickup to reproduce/record the management information from/onto at least one of the first and second temporary management areas of the recording medium, wherein, when closing the first session, the microcomputer is configured to change every currently open recording range contained in the first session to a closed recording range, while not closing an unrecorded area of a currently open recording range located last in the first session, and wherein a size of the first session is changed when the first session is closed, wherein the microcomputer is further configured to create a second session after the first session is closed, the second session including the unrecorded area of the currently open recording range located last in the first session as a start recording range of the second session for storing user data, and wherein the microcomputer is further configured to record a new list of currently open recording ranges onto at least one of the first and second temporary management areas, the new list of currently open recording ranges not including an identification corresponding to a recording range included in the list of opened recording ranges of the first session and subsequently changed when closing the first session from an open recording range to a closed recording range, the new list of currently open recording ranges including the unrecorded area of the currently open recording range located last in the first session as the start recording range of the second session;

an interface unit; and a host operatively coupled to the recording/reproducing part and configured to communicate with the recording/reproducing part by transmitting a command via the interface unit.

15. The system of claim 14, wherein the start recording range is an currently open recording range of the second session and the list of currently open recording range in the new management information includes an identification of the start recording range.

16. The system of claim 14, wherein the microcomputer is configured to change a recorded area of the open recording range which has a start address but of which end address is not defined into a closed recording range when closing the first session.

17. The system of claim 14, wherein the closed recording ranges are included in the first session.

18. A method of managing a recording medium having a data area, the method comprising steps of:

reading management information from at least one of first and second temporary management areas of the recording medium until the recording medium is finalized, the first temporary management area being allocated to a lead-in area by a predetermined size, the second temporary management area being allocated to a spare area by a non-predetermined size between 0 and a maximum size, the management information one or more entries respectively corresponding to one or more recording ranges generated on the recording medium, each entry including a start address of a corresponding recording range and indication information for indicating whether the corresponding recording range is a start recording range of the first session, the management information including a list of currently open recording ranges, wherein the list of currently open recording range includes one or more identifications which identify each currently open recording range existing on the recording medium, a maximum number of the identifications included in the list of currently open recording ranges being limited to a predetermined number;

determining whether a recording range in a first session allocated to the data area is either an currently open recording range having a recordable location or a closed recording range having no recordable location;

closing the first session, including changing every currently open recording range contained in the first session to a closed recording range, while not closing an unrecorded area of a currently open recording range located last in the first session, wherein a size of the first session is changed when the first session is closed;

after the first session is closed, creating a second session including, as a start recording range for storing user data, the unrecorded area of the currently open recording range located last in the first session; and recording new management information corresponding to the second session onto at least one of the first and second temporary management areas, wherein the new management information includes a new list of currently open recording ranges not including an identification corresponding to a recording range included in the list of opened recording ranges of the first session and subsequently changed when closing the first session from an open recording range to a closed recording range, the new list of currently open recording ranges including the unrecorded area of the currently open recording range located last in the first session as the start recording range of the second session.

19. The method of claim 18, wherein the maximum number of identifications is limited to 16.

20. The method of claim 18, wherein the closed recording ranges are included in the first session.

21. An apparatus of managing a recording medium having a first session comprising one or more recording ranges on a data area of the recording medium, comprising:

a microcomputer configured to determine whether a recording range in the first session is an currently open recording range having a recordable location or a closed recording range having no recordable location;

a pickup configured to read management information from at least one of first and second temporary management areas of the recording medium until the recording medium is finalized, the first temporary management area being allocated to a lead-in area by a predetermined size, the second temporary management area being allocated to a spare area by a non-predetermined size between 0 and a maximum size, the management information including one or more entries respectively corresponding to one or more recording ranges generated in the recording medium, each entry including a start address of a corresponding recording range and indication information for indicating whether the corresponding recording range is a start recording range of the first session, the management information also including a list of currently open recording ranges, wherein the list of currently open recording ranges includes one or more identifications that identify each currently open recording range existing on the recording medium, a maximum number of the identifications included in the list of currently open recording ranges being limited to a predetermined number;

a servo configured to control the pickup to read/record a signal from/onto the recording medium; and a data processor configured to process the signal read/recorded from/onto the recording medium, wherein the microcomputer is operatively coupled to the components above—the pickup, the data processor and the servo, and the microcomputer is configured to control the components so that the apparatus closes the first session, wherein, when closing the first session, the apparatus changes every currently open recording range contained in the first session to a closed recording range, while not closing an unrecorded area of a currently open recording range located last in the first session, wherein a size of the first session is changed when the first session is closed, and wherein the microcomputer is configured to control the components so that after closing the first session the apparatus creates a second session including, as a start recording range of the second session for storing user data, the unrecorded area of the currently open recording range located last in the first session, and the microcomputer is configured to control the components so that the apparatus records new management information onto at least one of the first and second temporary management areas, the new management information including a new list of currently open recording ranges not including an identification corresponding to a recording range included in the list of opened recording ranges of the first session and subsequently changed when closing the first session from an open recording range to a closed recording range, the new list of currently open recording ranges including the unrecorded area of the currently open recording range located last in the first session as the start recording range of the second session.

22. The apparatus of claim 21, wherein the maximum number of the identifications is limited to 16.

23. The apparatus of claim 21, wherein the new management information includes an entry corresponding to the start recording range of the second session.

24. The apparatus of claim 21, wherein the microcomputer is configured to control the components so that the apparatus changes a recorded area of the open recording range which has a start address but of which end address is not defined into a closed recording range when closing the first session.

25. The apparatus of claim 21, wherein the closed recording ranges are included in the first session.

26. The apparatus of claim 21, wherein the recording ranges are sequentially included in the first and second sessions.

* * * * *